US010716069B2

United States Patent
Gao et al.

(10) Patent No.: US 10,716,069 B2
(45) Date of Patent: Jul. 14, 2020

(54) POWER CONTROL METHOD AND POWER CONTROL APPARATUS FOR UPLINK CHANNELS

(71) Applicant: CHINA ACADEMY OF TELECOMMUNICATIONS TECHNOLOGY, Beijing (CN)

(72) Inventors: Xuejuan Gao, Beijing (CN); Yanan Lin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/114,820

(22) PCT Filed: Jan. 27, 2015

(86) PCT No.: PCT/CN2015/071631
§ 371 (c)(1),
(2) Date: Jul. 27, 2016

(87) PCT Pub. No.: WO2015/113486
PCT Pub. Date: Aug. 6, 2015

(65) Prior Publication Data
US 2016/0353387 A1 Dec. 1, 2016

(30) Foreign Application Priority Data
Jan. 28, 2014 (CN) .......................... 2014 1 0042382

(51) Int. Cl.
*H04W 52/14* (2009.01)
*H04W 52/34* (2009.01)
(Continued)

(52) U.S. Cl.
CPC ......... *H04W 52/146* (2013.01); *H04W 52/34* (2013.01); *H04W 52/346* (2013.01); *H04W 52/367* (2013.01); *H04W 52/325* (2013.01)

(58) Field of Classification Search
CPC . H04W 52/146; H04W 52/325; H04W 52/34; H04W 52/367; H04W 36/005;
(Continued)

(56) References Cited

U.S. PATENT DOCUMENTS

2011/0141959 A1* 6/2011 Damnjanovic ....... H04L 1/1854
370/311
2011/0235620 A1* 9/2011 Ahn ...................... H04W 56/00
370/336
(Continued)

FOREIGN PATENT DOCUMENTS

CN      102301800 A      12/2011
CN      102301801 A      12/2011
(Continued)

OTHER PUBLICATIONS

ETSI TS 136 213 V10.2.0.*
(Continued)

*Primary Examiner* — Zhitong Chen
(74) *Attorney, Agent, or Firm* — Ladas & Parry, LLP

(57) ABSTRACT

The present disclosure provides a power control method and a power control apparatus for uplink channels. The power control method includes steps of: determining, by a UE, target transmission powers for the uplink channels in each carrier group, the UE being configured with at least two carrier groups, UCI in each carrier group being fed back via PUCCH(s) and/or PUSCH(s) on at least one uplink carrier corresponding to the carrier group; determining, by the UE, whether or not a sum of the target transmission powers for the simultaneous transmission uplink channels exceeds an
(Continued)

allowable maximum transmission power of the UE; and in the case that the sum of the target transmission powers for the simultaneous transmission uplink channels exceeds the allowable maximum transmission power of the UE, reducing, by the UE, powers for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE. According to the present disclosure, it is able to perform uplink power control in the case that the UE supports the independent UCI feedback for different carrier groups.

4 Claims, 1 Drawing Sheet

(51) Int. Cl.
*H04W 52/36* (2009.01)
*H04W 52/32* (2009.01)

(58) Field of Classification Search
CPC ... H04W 40/10; H04W 52/02; H04W 52/248; H04W 52/346; H04W 72/0413; H04W 72/10; H04W 88/10; Y02B 60/50; H04L 1/0001; H04L 47/10; H04L 47/127; H04L 5/003
See application file for complete search history.

(56) References Cited

U.S. PATENT DOCUMENTS

| | | | |
|---|---|---|---|
| 2011/0249578 A1* | 10/2011 | Nayeb Nazar | H04L 1/0027 370/252 |
| 2011/0280169 A1 | 11/2011 | Seo et al. | |
| 2011/0287804 A1* | 11/2011 | Seo | H04W 52/146 455/522 |
| 2012/0093117 A1* | 4/2012 | Suzuki | H04L 5/001 370/329 |
| 2012/0113962 A1 | 5/2012 | Jen | |
| 2013/0176953 A1* | 7/2013 | Stern-Berkowitz | H04W 52/146 370/329 |
| 2014/0079008 A1* | 3/2014 | Park | H04L 1/1896 370/329 |
| 2014/0171144 A1* | 6/2014 | Kim | H04W 52/281 455/522 |
| 2014/0192738 A1* | 7/2014 | Nam | H04L 5/001 370/329 |
| 2014/0219203 A1* | 8/2014 | Lin | H04W 52/34 370/329 |
| 2014/0348078 A1 | 11/2014 | Kim et al. | |
| 2015/0063245 A1 | 3/2015 | Gao et al. | |
| 2015/0358918 A1* | 12/2015 | Gao | H04W 52/146 455/522 |

FOREIGN PATENT DOCUMENTS

| | | |
|---|---|---|
| CN | 102378254 A | 3/2012 |
| CN | 102461045 | 5/2012 |
| CN | 102547871 | 7/2012 |
| CN | 102869080 A | 1/2013 |
| CN | 103037529 A | 4/2013 |
| CN | 103124428 A | 5/2013 |
| CN | 103369650 | 10/2013 |
| JP | 2012516607 A | 7/2012 |
| JP | 2012530398 A | 11/2012 |
| KR | 10-2013-0025427 A | 3/2013 |
| WO | 2012/167727 A1 | 12/2012 |
| WO | 2013/025562 A2 | 2/2013 |
| WO | 2013019034 | 2/2013 |
| WO | 2013042980 | 3/2013 |

OTHER PUBLICATIONS

International Search Report for PCT/CN2015/071631 dated on May 4, 2015 and its English translation provided by WIPO.
Written Opinion of the International Search Authority for PCT/CN2015/071631 dated on May 4, 2015 and its English translation provided by Google Translate.
EPO Supplementary Search Report and Opinion for EPO application No. 15743757.5 dated Nov. 25, 2016.
From CN Application No. 201410042382.4: Office Action and search report dated Oct. 9, 2017 and its English translation provided by foreign associate.
From EP Application No. 15743757.5: Office Action dated Oct. 13, 2017.
From JP Application No. 2016-548683: Office Action dated Aug. 30, 2017 and its English translation provided by foreign associate.
From KR Application No. 10-2016-7021905: Office Action dated Sep. 6, 2017 and its English translation provided by foreign associate.
From TW Application No. 10421499470, Office Action and search report dated Nov. 6, 2015 and its English translation provided by foreign associate.
From PCT/CN2015/071631, Written Opinion dated May 4, 2015 and it's English translation from WIPO.
From PCT/CN2015/071631, Ch. 1 International Preliminary Report on Patentability (IPRP) dated Aug. 2, 2016 and it's English translation from WIPO.
R1-20754. Fujitsu Discussion on simultaneous transmissions of PRACH and PUCCH/PUSCH/SRS. 3GPP TSG RAN WG1. Meeting #68. Dresden, Germany, Feb. 6-10, 2012. pp. 1-4.
R2-133538. LG Electronics Inc. "Management of UE Transmit Power in Dual Connectivity". 3GPP TSG-RAN2 Meeting #83bis. Ljubljana, Slovenia. Oct. 7-11, 2013. pp. 1-2.
R2434002. Qualcomm Inc. Procedures for dual connectivity. 3GPP TSG-RAN2#84. San Francisco, USA. Nov. 11-15, 2013. pp. 1-5.
From Chinese Application No. 201410042382.4: Office Action dated Jun. 27, 2018 with machine English translation.
From EP Application No. 15743757.5: Office Action dated Mar. 23, 2018.
From KR Application No. 10-2016-7021905: Office Action dated Mar. 30, 2018 and its English translation provided by foreign associate.
Communication Pursuant to Article 94(3) EPC, from EP app. No. 15743757.5-1219, dated Apr. 1, 2019.
Written Opinion of the International Searching Authority from PCT/CN2015/071631, dated May 4, 2015, with English translation from WIPO.
International Preliminary Report on Patentability from PCT/CN2015/071631 dated Aug. 2, 2016, with English translation from WIPO.
"Power reduction rule for uplink carrier aggregation", 3GPP TSG RAN WG1 #60bis Meeting, Beijing, China, Apr. 12-16, 2010.
Notice of Reasons for Refusal from JP app. No. 2016-548683, dated Aug. 20, 2019, with English translation from Global Dossier.
"Management of UE Transmit Power in Dual Connectivity" R2-134048, 3GPP TSG-RAN WG2 Meeting #84, San Francisco, USA, Nov. 11-15, 2013.
"Introduction of special cell in SCG" R2-134058, 3GPP TSG-RAN WG2 Meeting #84, San Francisco, USA, Nov. 11-15, 2013.
"Work on Dual Connectivity as a conclusion of SCE-HL Si" RP-131782, 3GPP TSG-RAN #62, Busan, Korea, Dec. 3-6, 2013.

* cited by examiner

POWER CONTROL METHOD AND POWER CONTROL APPARATUS FOR UPLINK CHANNELS

CROSS-REFERENCE TO RELATED APPLICATION

The present-application is the U.S. national phase of PCT Application No. PCT/CN2015/071631 filed on Jan. 27, 2015, which claims the priority of the Chinese patent application No.201410042382.4 filed on Jan. 28, 2014 and entitled "power control method and power control apparatus for uplink channels", the disclosures of which are incorporated herein by reference in their entireties.

TECHNICAL FIELD

The present application relates to the field of wireless communication technology, in particular to a power control method and a power control apparatus for uplink channels.

BACKGROUND

A Long Term Evolution-Advanced (LTE-A) system may support a transmission method for performing Uplink Control Information (UCI) feedback on the basis of carrier groups, i.e., dividing aggregation carriers into a plurality of carrier groups and performing the UCI feedback within each carrier group. An uplink carrier is designated in each carrier group, so as to feed back the UCI of the carrier group on the uplink carrier via a Physical Uplink Control Channel (PUCCH). Also, the UCI corresponding to the carriers in each carrier group may be fed back on a Physical Uplink Shared Channel (PUSCH) for the carrier group. Hence, for a User Equipment (UE), there may exist in an identical uplink subframe a plurality of PUCCH(s) and/or PUSCH(s) carrying the UCI for different carrier groups.

The UCI may include Acknowledgement/Non-Acknowledgement (ACK/NACK), Chanel State Information (CSI) and Scheduling Request (SR), and the CSI may include periodic CSI and aperiodic CSI.

LTE-A Release-10 (Rel-10) and Release-11 (Rel-11) systems merely support the PUCCH transmission on an uplink Primary Component Carrier (PCC). For the UE, the PUSCH transmission may exist in an identical uplink subframe on a plurality of uplink carriers simultaneously, but the UCI transmission may be carried by merely one of the PUSCH(s). In the case of the co-existence of the PUCCH(s) and the PUSCH(s) carrying the UCI, the UCI carried by the PUCCH(s) and the PUSCH(s) is of different types. For example, the PUCCH may carry the ACK/NACK, while the PUSCH carries the periodic CSI. In other words, the UCI carried by the PUCCH(s) is of a more important type, and there will not exist such a situation where the UCI of an identical type is carried simultaneously by the PUCCH(s) and/or PUSCH(s) or the UCI carried by the PUSCH(s) is of a more important type. Hence, during the power control, it is required to preferentially ensure that the transmission power for the PUCCH(s) is not reduced.

In the LTE-A system, there is the data transmission simultaneously over the PUCCH(s) and/or PUSCH(s) carrying the UCI, and it is not defined in the original system about how to reduce the power for the PUCCH(s) and/or PUSCH(s) carrying the UCI in the case of constrained power. In addition, the PUCCH(s) and/or PUSCH(s) may carry the UCI of an identical type or different types, e.g., they may carry the ACK/NACK, or one of the PUCCH(s) (or PUSCH(s)) may carry the periodic CSI for one carrier group while another one of the PUCCH(s) (or PUSCH(s)) may carry the ACK/NACK for another carrier group. In the case that the power is constrained but a power control scheme for the original system is still used, i.e., the transmission power for the PUCCH(s) is preferentially granted, the transmission of the UCI of an important type, e.g., the SR or the ACK/NACK may be adversely affected due to the reduction in the transmission power, and thereby the entire transmission performance for the system will be adversely affected.

In a word, there is currently no uplink power control scheme in the case that the UE supports the independent UCI feedback for different carrier groups.

SUMMARY

One embodiment of the present disclosure provides a power control method and a power control apparatus for uplink channels, so as to perform the uplink power control in the case that the UE supports the independent UCI feedback for different carrier groups.

The present disclosure provides in some embodiments a power control method for uplink channels, including steps of: determining, by a UE, target transmission powers for the uplink channels in each carrier group, the UE being configured with at least two carrier groups, UCI in each carrier group being fed back via PUCCH(s) and/or PUSCH(s) on at least one uplink carrier corresponding to the carrier group; determining, by the UE, whether or not a sum of the target transmission powers for the simultaneous transmission uplink channels exceeds an allowable maximum transmission power of the UE; and in the case that the sum of the target transmission powers for the simultaneous transmission uplink channels exceeds the allowable maximum transmission power of the UE, reducing, by the UE, powers for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE.

Alternatively, the step of reducing the powers at least in accordance with the priorities of the types of the UCI includes one of: reducing the powers in accordance with the priorities of the types of the UCI; reducing the powers in accordance with the priorities of the types of the UCI and priorities of carriers; reducing the powers in accordance with the priorities of the types of the UCI and priorities of channels; and reducing the powers in accordance with the priorities of the types of the UCI, the priories of the carriers and the priorities of the channels.

Alternatively, the priorities of the types of the UCI include that a priority of an SR≥a priority of an ACK/NACK>a priority of CSI.

Alternatively, the priorities of the carriers include that a priority of a PCC>a priority of any other component carrier, and/or a priority of carriers in a carrier group that includes a PCC>a priority of carriers in a carrier group that does not include a PCC.

Alternatively, the priorities of the channels include that a priority of the PUCCH>a priority of the PUSCH; and/or the priority of the PUCCH>a priority of the PUSCH with UCI>a priority of the PUSCH without UCI; and/or in the case that the current subframe includes a Physical Random Access Channel (PRACH), a priority of the PRACH≥the priority of the PUCCH>the priority of the PUSCH; and/or in the case that the current subframe includes the PRACH, the priority of the PRACH≥the priority of the PUCCH>the priority of the PUSCH with UCI>the priority of the PUSCH without UCI.

Alternatively, the step of reducing the powers in accordance with the priorities of the types of the UCI includes: determining power allocation priorities in accordance with the priorities of the types of the UCI, a scheme A for the determined allocation priorities including a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; and reducing the powers of the PUCCH(s) and/or PUSCH(s) in an ascending order of the power allocation priorities in accordance with the scheme A.

Alternatively, the scheme A further includes that the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

Alternatively, the step of reducing the powers in accordance with the priorities of the types of the UCI and the priorities of the carriers includes: determining power allocation priorities in accordance with the priorities of the types of the UCI and the priorities of the carriers, the determined scheme for the power allocation priorities including a scheme B or a scheme C; and reducing the power of the PUCCH(s) and/or PUSCH(s) in an ascending order of the power allocation priorities in accordance with the scheme B or scheme C.

Alternatively, the scheme B includes that power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI. For the PUCCH(s) with at least the UCI of an identical type and/or PUSCH(s) with at least the UCI of an identical type, the scheme B includes that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, or power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC.

Alternatively, the scheme C includes that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, for the PUCCH(s) with UCI of the carrier group including the PCC and PUSCH(s) with UCI of the carrier group including the PCC, the scheme C includes that power allocation priority of the PUCCH with SR≥power allocation priorities of the PUCCH with ACK/NACK and PUSCH(s) with ACK/NACK>power allocation priorities of the PUCCH with CSI and PUSCH with CSI>power allocation priority of the PUSCH without UCI, and for the PUCCH(s) with UCI of the carrier group not including PCC and PUSCH(s) with UCI of the carrier group not including PCC, the scheme C includes that a power allocation priority of the PUCCH with SR≥power allocation priorities of the PUCCH(s) with ACK/NACK and PUSCH(s) with ACK/NACK>power allocation priorities of the PUCCH with CSI and PUSCH with CSI>a power allocation priority of the PUSCH without UCI; or the scheme C includes that power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC, for the PUCCH(s) with UCI including the UCI of the PCC and PUSCH(s) with UCI including the UCI of the PCC, the scheme C includes that a power allocation priority of the PUCCH with SR≥power allocation priorities of the PUCCH(s) with ACK/NACK and PUSCH(s) with ACK/NACK>power allocation priorities of the PUCCH with CSI and PUSCH with CSI>a power allocation priority of the PUSCH without UCI, and for the PUCCH(s) with UCI not including the UCI of the PCC and PUSCH(s) with UCI not including the UCI of the PCC, the scheme C includes that a power allocation priority of the PUCCH with SR≥power allocation priorities of the PUCCH(s) with ACK/NACK and PUSCH(s) with ACK/NACK>power allocation priorities of the PUCCH with CSI and PUSCH with CSI>a power allocation priority of the PUSCH without UCI.

Alternatively, the scheme B and/or the scheme C further include that: for the PUCCH(s) with UCI of the carrier group not including the PCC and PUSCH(s) with UCI of the carrier group not including the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority; or for the PUCCH(s) with UCI not including the UCI of the PCC and PUSCH(s) with UCI not including the UCI of the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

Alternatively, the step of reducing the powers in accordance with the priorities of the types of the UCI and the priorities of the channels includes: determining power allocation priorities in accordance with the priorities of the types of the UCI and the priorities of the channels, a determined scheme for the power allocation priorities including a scheme D or a scheme E; and reducing the power of the PUCCH(s) and/or PUSCH(s) in an ascending order of the power allocation priorities in accordance with the scheme D or scheme E.

Alternatively, the scheme D includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and for the PUCCH(s) with at least the UCI of an identical type and PUSCH(s) with at least the UCI of an identical type, the scheme D includes that a power allocation priority of the PUCCH with UCI>a power allocation priority of the PUSCH with UCI.

Alternatively, the scheme E includes that a power allocation priority of the PUCCH with SR≥a power allocation priority of the PUCCH with ACK/NACK>a power allocation priority of the PUCCH with CSI, a power allocation priority of the PUSCH with ACK/NACK>a power allocation priority of the PUSCH with CSI>a power allocation priority of the PUSCH without UCI, and a power allocation priority of the PUCCH with UCI>a power allocation priority of the PUSCH with UCI.

Alternatively, the scheme D and/or the scheme E further include that the PUCCHs with at least the UCI of an identical type have an identical power allocation priority, and the PUSCHs with at least the UCI of an identical type have an identical power allocation priority.

Alternatively, the step of reducing the powers in accordance with the priorities of the types of the UCI, the priorities of the carriers and the priorities of the channels includes: determining power allocation priorities in accordance with the priorities of the types of the UCI, the priorities of the carriers and the priorities of the channels, a determined scheme for the power allocation priorities including a scheme F, a scheme G, a scheme H, a scheme I, a scheme J or a scheme K; and reducing the power of the PUCCH(s) and/or PUSCH(s) in an ascending order of the power allocation priorities in accordance with the scheme F, scheme G, scheme H, scheme I, scheme J or scheme K.

Alternatively, the scheme F includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and/or PUSCH(s) with at least the UCI of an identical type, power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, or power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC; and for the PUCCH(s) with at least the UCI of an identical type of the carrier group including the PCC and PUSCH(s) with at least the UCI of an identical type of the carrier group including the PCC, and the PUCCH(s) with at least the UCI of an identical type of the carrier group not including the PCC and PUSCH(s) with at least the UCI of an identical type of the carrier group not including the PCC, the scheme F includes that a power allocation priority of the PUCCH with UCI>a power allocation priority of the PUSCH with UCI.

Alternatively, the scheme G includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and PUSCH(s) with at least the UCI of an identical type, the scheme G includes that a power allocation priority of the PUCCH with UCI>a power allocation priority of the PUSCH with UCI; for the PUCCHs with at least the UCI of an identical type, the scheme G includes that a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; and for the PUSCHs with at least the UCI of an identical type, the scheme G includes that a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, the scheme H includes that a power allocation priority of the PUCCH with UCI>a power allocation priority of the PUSCH with UCI; a power allocation priority of the PUCCH with SR≥a power allocation priority of the PUCCH with ACK/NACK>a power allocation priority of the PUCCH with CSI; a power allocation priority of the PUSCH with ACK/NACK>a power allocation priority of the PUSCH with CSI>a power allocation priority of the PUSCH without UCI; for the PUCCHs with at least the UCI of an identical type, the scheme H includes that a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; and for the PUSCHs with at least the UCI of an identical type, the scheme H includes that a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, the scheme I includes that a power allocation priority of the PUCCH with UCI>a power allocation priority of the PUSCH with UCI; a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC; for the PUCCH(s) with UCI of the carrier group including the PCC and the PUCCH(s) with UCI of the carrier group not including the PCC, or for the PUCCH(s) with UCI including the UCI of the PCC and the PUCCH(s) with UCI not including the UCI of the PCC, the scheme I includes that a power allocation priority of the PUCCH with SR≥a power allocation priority of the PUCCH with ACK/NACK>a power allocation priority of the PUCCH with CSI; and for the PUSCH(s) with UCI of the carrier group including the PCC and the PUSCH(s) with UCI of the carrier group not including the PCC, or for the PUSCH(s) with UCI including the UCI of the PCC and the PUSCH(s) with UCI not including the UCI of the PCC, the scheme I includes that a power allocation priority of the PUSCH with ACK/NACK>a power allocation priority of the PUSCH with CSI>a power allocation priority of the PUSCH without UCI.

Alternatively, the scheme J includes that power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; for the PUCCH(s) with UCI of the carrier group including the PCC and PUSCH(s) with UCI of the carrier group including the PCC or for the PUCCH(s) with UCI including the UCI of the PCC and PUSCH(s) with UCI including the UCI of the PCC, the scheme J includes that a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI; and for the PUCCH(s) with UCI of the carrier group not including the PCC and PUSCH(s) with UCI of the carrier group not including the PCC or for the PUCCH(s) with UCI not including the UCI of the PCC and PUSCH(s) with UCI not including the UCI of the PCC, the scheme J includes that a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI.

Alternatively, the scheme K includes that power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; and for the PUCCH(s) with UCI of the carrier group including the PCC and PUSCH(s) with UCI of the carrier group including the PCC and for the PUCCH(s) with UCI of the carrier group not including the PCC and PUSCH(s) with UCI of the carrier group not including the PCC, the scheme K includes that a power allocation priority of the PUCCH with UCI>a power allocation priority of the PUSCH with UCI, a power allocation priority of the PUCCH with SR≥a power allocation priority of the PUCCH with ACK/NACK>a power allocation priority of the PUCCH with CSI, and a power allocation priority of the PUSCH with ACK/NACK>a power allocation priority of the PUSCH with CSI>a power allocation priority of the PUSCH without UCI, or for the PUCCH(s) with UCI including the UCI of the PCC and PUSCH(s) with UCI including the UCI of the PCC and for the PUCCH(s) with UCI not including the UCI of the PCC and PUSCH(s) with UCI not including the UCI of the PCC, the scheme K includes that a power allocation priority of the PUCCH with UCI>a power allocation priority of the PUSCH with UCI, a power allocation priority of the PUCCH with SR≥a power allocation priority of the PUCCH with ACK/NACK>a power allocation priority of the PUCCH with CSI, and a power allocation priority of the PUSCH with ACK/NACK>a power allocation priority of the PUSCH with CSI>a power allocation priority of the PUSCH without UCI.

Alternatively, the scheme F, scheme G, scheme H, scheme I, scheme J or scheme K further includes that, for the PUCCH(s) with UCI of the carrier group not including the PCC and PUSCH(s) with UCI of the carrier group not including the PCC, the PUCCHs with at least the UCI of an identical type have an identical power allocation priority and the PUSCHs with at least the UCI of an identical type have an identical power allocation priority, or for the PUCCH(s) with UCI not including the UCI of the PCC and PUSCH(s) with UCI not including the UCI of the PCC, the PUCCHs with at least the UCI of an identical type have an identical power allocation priority and the PUSCHs with at least the UCI of an identical type have an identical power allocation priority.

Alternatively, in the case that the uplink channels whose powers need to be reduced include a plurality of uplink channels having an identical power allocation priority, the power for the plurality of uplink channels is reduced with equal proportion, and the uplink channels include one or more of PUCCH, PUSCH and PRACH.

Alternatively, in the case that the UCI of various types is carried in one uplink channel, the power allocation priority of the uplink channel is determined in accordance with the highest power allocation priority corresponding to the UCI of various types.

Alternatively, the CSI includes periodic CSI and aperiodic CSI, the aperiodic CSI has a power allocation priority higher than the periodic CSI, or in the presence of the PUSCH with aperiodic CSI, a power allocation priority of the PUSCH with aperiodic CSI is equal to, greater than, or smaller than a power allocation priority of the PUCCH with periodic CSI.

In another aspect, the present disclosure provides in some embodiments a UE, including: a determination unit configured to determine target transmission power for uplink channels in each carrier group, the UE being configured with at least two carrier groups, UCI in each carrier group being fed back via PUCCH(s) and/or PUSCH(s) on at least one uplink carrier corresponding to the carrier group; a judgment unit configured to determine whether or not a sum of the target transmission power for the simultaneous transmission uplink channels exceeds allowable maximum transmission power of the UE; and a power control unit configured to, in the case that the sum of the target transmission power for the simultaneous transmission uplink channels exceeds the allowable maximum transmission power of the UE, reduce power for the PUCCH(s) and/or PUSCH(s) carrying the UCI of different carrier groups among the simultaneous transmission uplink channels at least in accordance with priorities of types of the UCI, so that a sum of the transmission power for all the uplink channels in a current uplink subframe does not exceed the allowable maximum transmission power of the UE.

Alternatively, the power control unit is further configured to: reduce the power in accordance with the priorities of the types of the UCI; reduce the power in accordance with the priorities of the types of the UCI and priorities of carriers; reduce the power in accordance with the priorities of the types of the UCI and priorities of channels; or reduce the power in accordance with the priorities of the types of the UCI, the priories of the carriers and the priorities of the channels.

Alternatively, the priorities of the types of the UCI include that a priority of an SR≥a priority of an ACK/NACK>a priority of CSI.

Alternatively, the priorities of the carriers include that a priority of a PCC>a priority of any other component carrier; and/or a priority of carriers in a carrier group that includes a PCC>a priority of carriers in a carrier group that does not include a PCC.

Alternatively, the priorities of the channels include that a priority of the PUCCH>a priority of the PUSCH; and/or the priority of the PUCCH>a priority of the PUSCH with UCI>a priority of the PUSCH without UCI; and/or in the case that the current subframe includes a Physical Random Access Channel (PRACH), a priority of the PRACH≥the priority of the PUCCH>the priority of the PUSCH; and/or in the case that the current subframe includes the PRACH, the priority of the PRACH≥the priority of the PUCCH>the priority of the PUSCH with UCI>the priority of the PUSCH without UCI.

Alternatively, the power control unit is further configured to: determine power allocation priorities in accordance with the priorities of the types of the UCI, a scheme A for the determined allocation priorities including a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; and reduce the power of the PUCCH(s) and/or PUSCH(s) in an ascending order of the power allocation priorities in accordance with the scheme A.

Alternatively, the scheme A further includes that the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

Alternatively, the power control unit is further configured to: determine power allocation priorities in accordance with the priorities of the types of the UCI and the priorities of the carriers, the determined scheme for the power allocation priorities including a scheme B or a scheme C; and reduce the power of the PUCCH(s) and/or PUSCH(s) in an ascending order of the power allocation priorities in accordance with the scheme B or scheme C.

Alternatively, the scheme B includes that power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and/or PUSCH(s) with at least the UCI of an identical type, the scheme B includes that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, or power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC.

Alternatively, the scheme C includes that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, for the PUCCH(s) with UCI of the carrier group including the PCC and PUSCH(s) with UCI of the carrier group including the PCC, the scheme C includes that power allocation priority of the PUCCH with SR≥power allocation priorities of the PUCCH(s) with ACK/NACK and PUSCH(s) with ACK/NACK>power allocation priorities of the PUCCH with CSI and PUSCH with CSI>power allocation priority of the PUSCH without UCI, and for the PUCCH(s) with UCI of the carrier group not including PCC and PUSCH(s) with UCI of the carrier group not including PCC, the scheme C includes that a power allocation priority of the PUCCH with SR≥power allocation priorities of the PUCCH(s) with ACK/NACK and PUSCH(s) with ACK/NACK>power allocation priorities of the PUCCH with CSI and PUSCH with CSI>a power allocation priority of the PUSCH without UCI; or the scheme C includes that power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC, for the PUCCH(s) with UCI including the UCI of the PCC and PUSCH(s) with UCI including the UCI of the PCC, the scheme C includes that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI, and for the PUCCH(s) with UCI not including the UCI of the PCC and PUSCH(s) with UCI not including the UCI of the PCC, the scheme C includes that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI.

Alternatively, the scheme B and/or the scheme C further include that: for the PUCCH(s) with UCI of the carrier group not including the PCC and PUSCH(s) with UCI of the carrier group not including the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority; or for the PUCCH(s) with UCI not including the UCI of the PCC and PUSCH(s) with UCI not including the UCI of the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

Alternatively, the power control unit is further configured to: determine power allocation priorities in accordance with the priorities of the types of the UCI and the priorities of the channels, a determined scheme for the power allocation priorities including a scheme D or a scheme E; and reduce the power of the PUCCH(s) and/or PUSCH(s) in an ascending order of the power allocation priorities in accordance with the scheme D or scheme E.

Alternatively, the scheme D includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and for the PUCCH(s) with at least the UCI of an identical type and PUSCH(s) with at least the UCI of an identical type, the scheme D includes that a power allocation priority of the PUCCH with UCI>a power allocation priority of the PUSCH with UCI.

Alternatively, the scheme E includes that a power allocation priority of the PUCCH with SR≥a power allocation priority of the PUCCH with ACK/NACK>a power allocation priority of the PUCCH with CSI, a power allocation priority of the PUSCH with ACK/NACK>a power allocation priority of the PUSCH with CSI>a power allocation priority of the PUSCH without UCI, and a power allocation priority of the PUCCH with UCI>a power allocation priority of the PUSCH with UCI.

Alternatively, the scheme D and/or the scheme E further include that the PUCCHs with at least the UCI of an identical type have an identical power allocation priority, and the PUSCHs with at least the UCI of an identical type have an identical power allocation priority.

Alternatively, the power control unit is further configured to: determine power allocation priorities in accordance with the priorities of the types of the UCI, the priorities of the carriers and the priorities of the channels, a determined scheme for the power allocation priorities including a scheme F, a scheme G, a scheme H, a scheme I, a scheme J or a scheme K; and reduce the power of the PUCCH(s) and/or PUSCH(s) in an ascending order of the power allocation priorities in accordance with the scheme F, scheme G, scheme H, scheme I, scheme J or scheme K.

Alternatively, the scheme F includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and/or PUSCH(s) with at least the UCI of an identical type, power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, or power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC; and for the PUCCH(s) with at least the UCI of an identical type of the carrier group including the PCC and PUSCH(s) with at least the UCI of an identical type of the carrier group including the PCC, and the PUCCH(s) with at least the UCI of an identical type of the carrier group not including the PCC and PUSCH(s) with at least the UCI of an identical type of the carrier group not including the PCC, the scheme F includes that a power allocation priority of the PUCCH with UCI>a power allocation priority of the PUSCH with UCI.

Alternatively, the scheme G includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and PUSCH(s) with at least the UCI of an identical type, the scheme G includes that a power allocation priority of the PUCCH with UCI>a power allocation priority of the PUSCH with UCI; for the PUCCH(s) with at least the UCI of an identical type, the scheme G includes that a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; and for the PUSCH(s) with at least the UCI of an identical type, the scheme G includes that a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, the scheme H includes that a power allocation priority of the PUCCH with UCI>a power allocation priority of the PUSCH with UCI; a power allocation priority of the PUCCH with SR≥a power allocation priority of the PUCCH with ACK/NACK>a power allocation priority of the PUCCH with CSI; a power allocation priority of the PUSCH with ACK/NACK>a power allocation priority of the PUSCH with CSI>a power allocation priority of the PUSCH without UCI; for the PUCCH(s) with at least the UCI of an identical type, the scheme H includes that a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; and for the PUSCH(s) with at least the UCI of an identical type, the scheme H includes that a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, the scheme I includes that a power allocation priority of the PUCCH with UCI>a power allocation priority of the PUSCH with UCI; a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC; for the PUCCH(s) with UCI of the carrier group including the PCC and the PUCCH(s) with UCI of the carrier group not including the PCC, or for the PUCCH(s) with UCI including the UCI of the PCC and the PUCCH(s) with UCI not including the UCI of the PCC, the scheme I includes that a power allocation priority of the PUCCH with SR≥a power allocation priority of the PUCCH with ACK/NACK>a power allocation priority of the PUCCH with CSI; and for the PUSCH(s) with UCI of the carrier group including the PCC and the PUSCH(s) with UCI of the carrier group not including the PCC, or for the PUSCH(s) with UCI including the UCI of the PCC and the PUSCH(s) with UCI not including the UCI of the PCC, the scheme I includes that a power allocation priority of the PUSCH with ACK/NACK>a power allocation priority of the PUSCH with CSI>a power allocation priority of the PUSCH without UCI.

Alternatively, the scheme J includes that power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; for the PUCCH(s) with UCI of the carrier group including the PCC and PUSCH(s) with UCI of the carrier group including the PCC or for the PUCCH(s) with UCI including the UCI of the PCC and PUSCH(s) with UCI including the UCI of the PCC, the scheme J includes that a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI; and for the PUCCH(s) with UCI of the carrier group not including the PCC and PUSCH(s) with UCI of the carrier group not including the PCC or for the PUCCH(s) with UCI not including the UCI of the PCC and PUSCH(s) with UCI not including the UCI of the PCC, the scheme J includes that a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI.

Alternatively, the scheme K includes that power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; and for the PUCCH(s) with UCI of the carrier group including the PCC and PUSCH(s) with UCI of the carrier group including the PCC and the PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and the PUCCH(s) with the UCI not including the UCI of the PCC and PUSCH(s) with the UCI not including the UCI of the PCC, a power allocation priority of the PUCCH with UCI>a power allocation priority of the PUSCH with UCI; for the PUCCH(s) with UCI of the carrier group including the PCC and PUSCH(s) with UCI of the carrier group including the PCC and PUCCH(s) and PUSCH(s) with UCI of the carrier group not including the PCC, or for the PUCCH(s) with UCI including the UCI of the PCC and PUSCH(s) with UCI including the UCI of the PCC and the PUCCH(s) with UCI not including the UCI of the PCC and PUSCH(s) with UCI not including the UCI of the PCC, a power allocation priority of the PUCCH with SR≥a power allocation priority of the PUCCH with ACK/NACK>a power allocation prior-ity of the PUCCH with CSI; and for the PUCCH(s) with UCI of the carrier group including the PCC and PUSCH(s) with UCI of the carrier group including the PCC and PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and the PUCCH(s) with UCI not including the UCI of the PCC and PUSCH(s) with UCI not including the UCI of the PCC, a power allocation priority of the PUSCH with ACK/NACK>a power allocation priority of the PUSCH with CSI>a power allocation priority of the PUSCH without UCI.

Alternatively, the scheme F, scheme G, scheme H, scheme I, scheme J or scheme K further includes that, for the PUCCH(s) with UCI of the carrier group not including the PCC and PUSCH(s) with UCI of the carrier group not including the PCC, the PUCCHs with at least the UCI of an identical type have an identical power allocation priority and the PUSCHs with at least the UCI of an identical type have an identical power allocation priority, or for the PUCCH(s) with UCI not including the UCI of the PCC and PUSCH(s) with UCI not including the UCI of the PCC, the PUCCHs with at least the UCI of an identical type have an identical power allocation priority and the PUSCHs with at least the UCI of an identical type have an identical power allocation priority.

Alternatively, the power control unit is further configured to, in the case that the uplink channels whose powers need to be reduced include a plurality of uplink channels having an identical power allocation priority, reduce the power for the plurality of uplink channels with equal proportion, and the uplink channels include one or more of PUCCH, PUSCH and PRACH.

Alternatively, the power control unit is further configured to, in the case that the UCI of various types is carried in one uplink channel, determine the power allocation priority of the one uplink channel in accordance with the highest power allocation priority corresponding to the UCI of various types.

Alternatively, the CSI includes periodic CSI and aperiodic CSI, the aperiodic CSI has a power allocation priority higher than the periodic CSI, or in the presence of the PUSCH with aperiodic CSI, a power allocation priority of the PUSCH with aperiodic CSI is equal to, greater than, or smaller than a power allocation priority of the PUCCH with periodic CSI.

In yet another aspect, the present disclosure provides in some embodiments a UE, including: a processor configured to read a program stored in a memory, so as to: determine target transmission powers for uplink channels in each carrier group, the UE being configured with at least two carrier groups, UCI in each carrier group being fed back via PUCCH(s) and/or PUSCH(s) on at least one uplink carrier corresponding to the carrier group; determine whether or not a sum of the target transmission powers for the simultaneous transmission uplink channels exceeds an allowable maximum transmission power of the UE; and in the case that the sum of the target transmission powers for the simultaneous transmission uplink channels exceeds the allowable maximum transmission power of the UE, reduce power for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE; a transceiver configured to receive and transmit data under the control of the processor; and the memory configured to store therein the data for the operation of the processor.

Alternatively, the processor is further configured to read the program stored in the memory, so as to: reduce the powers in accordance with the priorities of the types of the UCI; reduce the powers in accordance with the priorities of the types of the UCI and priorities of carriers; reduce the powers in accordance with the priorities of the types of the UCI and priorities of channels; or reduce the powers in accordance with the priorities of the types of the UCI, the priories of the carriers and the priorities of the channels.

Alternatively, the priorities of the types of the UCI include that a priority of an SR≥a priority of an ACK/NACK>a priority of CSI.

Alternatively, the priorities of the carriers include that a priority of a PCC>a priority of any other component carrier; and/or a priority of carriers in a carrier group that includes a PCC>a priority of carriers in a carrier group that does not include a PCC.

Alternatively, the priorities of the channels include that a priority of the PUCCH>a priority of the PUSCH; and/or the priority of the PUCCH>a priority of the PUSCH with UCI>a priority of the PUSCH without UCI; and/or in the case that the current subframe includes a Physical Random Access Channel (PRACH), a priority of the PRACH>the priority of the PUCCH>the priority of the PUSCH; and/or in the case that the current subframe includes the PRACH, the priority of the PRACH≥the priority of the PUCCH>the priority of the PUSCH with UCI>the priority of the PUSCH without UCI.

Alternatively, the processor is further configured to read the program stored in the memory, so as to: determine power allocation priorities in accordance with the priorities of the types of the UCI, a scheme A for the determined allocation priorities including a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; and reduce the power of the PUCCH(s) and/or PUSCH(s) in an ascending order of the power allocation priorities in accordance with the scheme A.

Alternatively, the scheme A further includes that the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

Alternatively, the processor is further configured to read the program stored in the memory, so as to: determine power allocation priorities in accordance with the priorities of the types of the UCI and the priorities of the carriers, the determined scheme for the power allocation priorities including a scheme B or a scheme C; and reduce the power of the PUCCH(s) and/or PUSCH(s) in an ascending order of the power allocation priorities in accordance with the scheme B or scheme C.

Alternatively, the scheme B includes that power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and/or PUSCH(s) with at least the UCI of an identical type, the scheme B includes that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, or power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC.

Alternatively, the scheme C includes that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, for the PUCCH(s) with UCI of the carrier group including the PCC and PUSCH(s) with UCI of the carrier group including the PCC, the scheme C includes that power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>power allocation priority of the PUSCH without UCI, and for the PUCCH(s) with UCI of the carrier group not including PCC and PUSCH(s) with UCI of the carrier group not including PCC, the scheme C includes that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI; or the scheme C includes that power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC, for the PUCCH(s) with UCI including the UCI of the PCC and PUSCH(s) with UCI including the UCI of the PCC, the scheme C includes that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI, and for the PUCCH(s) with UCI not including the UCI of the PCC and PUSCH(s) with UCI not including the UCI of the PCC, the scheme C includes that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI.

Alternatively, the scheme B and/or the scheme C further include that: for the PUCCH(s) with UCI of the carrier group not including the PCC and PUSCH(s) with UCI of the carrier group not including the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority; or for the PUCCH(s) with UCI not including the UCI of the PCC and PUSCH(s) with UCI not including the UCI of the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

Alternatively, the processor is further configured to read the program stored in the memory, so as to: determine power allocation priorities in accordance with the priorities of the types of the UCI and the priorities of the channels, a determined scheme for the power allocation priorities including a scheme D or a scheme E; and reduce the power of the PUCCH(s) and/or PUSCH(s) in an ascending order of the power allocation priorities in accordance with the scheme D or scheme E.

Alternatively, the scheme D includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and for the PUCCH(s) with at least the UCI of an identical type and PUSCH(s) with at least the UCI of an identical type, the scheme D includes that a power allocation priority of the PUCCH with UCI>a power allocation priority of the PUSCH with UCI.

Alternatively, the scheme E includes that a power allocation priority of the PUCCH with SR≥a power allocation priority of the PUCCH with ACK/NACK>a power allocation priority of the PUCCH with CSI, a power allocation priority of the PUSCH with ACK/NACK>a power allocation priority of the PUSCH with CSI>a power allocation priority of the PUSCH without UCI, and a power allocation priority of the PUCCH with UCI>a power allocation priority of the PUSCH with UCI.

Alternatively, the scheme D and/or the scheme E further include that the PUCCHs with at least the UCI of an identical type have an identical power allocation priority, and the PUSCHs with at least the UCI of an identical type have an identical power allocation priority.

Alternatively, the processor is further configured to read the program stored in the memory, so as to: determine power allocation priorities in accordance with the priorities of the types of the UCI, the priorities of the carriers and the priorities of the channels, a determined scheme for the power allocation priorities including a scheme F, a scheme G, a scheme H, a scheme I, a scheme J or a scheme K; and reduce the power of the PUCCH(s) and/or PUSCH(s) in an ascending order of the power allocation priorities in accordance with the scheme F, scheme G, scheme H, scheme I, scheme J or scheme K.

Alternatively, the scheme F includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and/or PUSCH(s) with at least the UCI of an identical type, power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, or power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC; and for the PUCCH(s) with at least the UCI of an identical type of the carrier group including the PCC and PUSCH(s) with at least the UCI of an identical type of the carrier group including the PCC, and the PUCCH(s) with at least the UCI of an identical type of the carrier group not including the PCC and PUSCH(s) with at least the UCI of an identical type of the carrier group not including the PCC, the scheme F includes that a power allocation priority of the PUCCH with UCI>a power allocation priority of the PUSCH with UCI.

Alternatively, the scheme G includes that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; for the PUCCH(s) with at least the UCI of an identical type and PUSCH(s) with at least the UCI of an identical type, the scheme G includes that a power allocation priority of the PUCCH with UCI>a power allocation priority of the PUSCH with UCI; for the PUCCHs with at least the UCI of an identical type, the scheme G includes that a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; and for the PUSCHs with at least the UCI of an identical type, the scheme G includes that a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, the scheme H includes that a power allocation priority of the PUCCH with UCI>a power allocation priority of the PUSCH with UCI; a power allocation priority of the PUCCH with SR≥a power allocation priority of the PUCCH with ACK/NACK>a power allocation priority of the PUCCH with CSI; a power allocation priority of the PUSCH with ACK/NACK>a power allocation priority of the PUSCH with CSI>a power allocation priority of the PUSCH without UCI; for the PUCCH(s) with at least the UCI of an identical type, the scheme H includes that a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; and for the PUSCH(s) with at least the UCI of an identical type, the scheme H includes that a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, the scheme I includes that a power allocation priority of the PUCCH with UCI>a power allocation priority of the PUSCH with UCI; a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC; a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC; for the PUCCH(s) with UCI of the carrier group including the PCC and the PUCCH(s) with UCI of the carrier group not including the PCC, or for the PUCCH(s) with UCI including the UCI of the PCC and the PUCCH(s) with UCI not including the UCI of the PCC, the scheme I includes that a power allocation priority of the PUCCH with SR≥a power allocation priority of the PUCCH with ACK/NACK>a power allocation priority of the PUCCH with CSI; and for the PUSCH(s) with UCI of the carrier group including the PCC and the PUSCH(s) with UCI of the carrier group not including the PCC, or for the PUSCH(s) with UCI including the UCI of the PCC and the PUSCH(s) with UCI not including the UCI of the PCC, the scheme I includes that a power allocation priority of the PUSCH with ACK/NACK>a power allocation priority of the PUSCH with CSI>a power allocation priority of the PUSCH without UCI.

Alternatively, the scheme J includes that power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; for the PUCCH(s) with UCI of the carrier group including the PCC and PUSCH(s) with UCI of the carrier group including the PCC or for the PUCCH(s) with UCI including the UCI of the PCC and PUSCH(s) with UCI including the UCI of the PCC, the scheme J includes that a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI; and for the PUCCH(s) with UCI of the carrier group not including the PCC and PUSCH(s) with UCI of the carrier group not including the PCC or for the PUCCH(s) with UCI not including the UCI of the PCC and PUSCH(s) with UCI not including the UCI of the PCC, the scheme J includes that a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI.

Alternatively, the scheme K includes that power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; for the PUCCH(s) with UCI of the carrier group including the PCC and PUSCH(s) with UCI of the carrier group including the PCC and the PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and the PUCCH(s) with UCI not including the UCI of the PCC and PUSCH(s) with UCI not including the UCI of the PCC, a power allocation priority of the PUCCH with UCI>a power allocation priority of the PUSCH with UCI; for the PUCCH(s) with UCI of the carrier group including the PCC and PUSCH(s) with UCI of the carrier group including the PCC and PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and the PUCCH(s) with UCI not including the UCI of the PCC and PUSCH(s) with UCI not including the UCI of the PCC, a power allocation priority of the PUCCH with SR≥a power allocation priority of the PUCCH with ACK/NACK>a power allocation priority of the PUCCH with CSI; and for the PUCCH(s) with UCI of the carrier group including the PCC and PUSCH(s) with UCI of the carrier group including the PCC and PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and the PUCCH(s) with UCI not including the UCI of the PCC and PUSCH(s) with UCI not including the UCI of the PCC, a power allocation priority of the PUSCH with ACK/NACK>a power allocation priority of the PUSCH with CSI>a power allocation priority of the PUSCH without UCI.

Alternatively, the scheme F, scheme G, scheme H, scheme I, scheme J or scheme K further includes that, for the PUCCH(s) with UCI of the carrier group not including the PCC and PUSCH(s) with UCI of the carrier group not including the PCC, the PUCCHs with at least the UCI of an identical type have an identical power allocation priority and the PUSCHs with at least the UCI of an identical type have an identical power allocation priority, or for the PUCCH(s) with UCI not including the UCI of the PCC and PUSCH(s) with UCI not including the UCI of the PCC, the PUCCHs with at least the UCI of an identical type have an identical power allocation priority and the PUSCHs with at least the UCI of an identical type have an identical power allocation priority.

Alternatively, the processor is further configured to read the program stored in the memory so as to, in the case that the uplink channels whose power need to be reduced include a plurality of uplink channels having an identical power allocation priority, reduce the power for the plurality of uplink channels with equal proportion, and the uplink channels include one or more of PUCCH, PUSCH and PRACH.

Alternatively, the processor is further configured to read the program stored in the memory so as to, in the case that the UCI of various types is carried in one uplink channel, determine the power allocation priority of the uplink channel in accordance with the highest power allocation priority corresponding to the UCI of various types.

Alternatively, the CSI includes periodic CSI and aperiodic CSI, the aperiodic CSI has a power allocation priority higher than the periodic CSI, or in the presence of the PUSCH with aperiodic CSI, a power allocation priority of the PUSCH with aperiodic CSI is equal to, greater than, or smaller than a power allocation priority of the PUCCH with periodic CSI.

According to the embodiments of the present disclosure, the power for the PUCCH(s) and/or PUSCH(s) with UCI for different carrier groups may be reduced at least in accordance with the priorities of the types of the UCI, e.g., in accordance with the priorities of the types of the UCI, or in accordance with the priorities of the types of the UCI and the priorities of the carriers, or in accordance with the priorities of the types of the UCI and the priorities of the channels, or in accordance with the priorities of the types of the UCI, the priorities of the carriers and the priorities of the channels. As a result, in a scenario where the PUCCH(s) and/or the PUSCH(s) with UCI for carrier groups are used for the transmission simultaneously, it is able to perform the transmission power control over the uplink channels with UCI, thereby to ensure that the total transmission power of the UE does not exceed the allowable maximum transmission power of the UE.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

One embodiment of the present disclosure provides a power control method, so as to perform the transmission power control over uplink channels with UCI in a scenario where PUCCH(s) and/or PUSCH(s) with UCI for different carriers are used for transmission simultaneously, thereby to ensure that the total transmission power of a UE does not exceed allowable maximum transmission power of the UE. The power control method in the embodiments of the present disclosure may be applicable to an LTE system or an LTE-A system, or any other similar communication systems.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
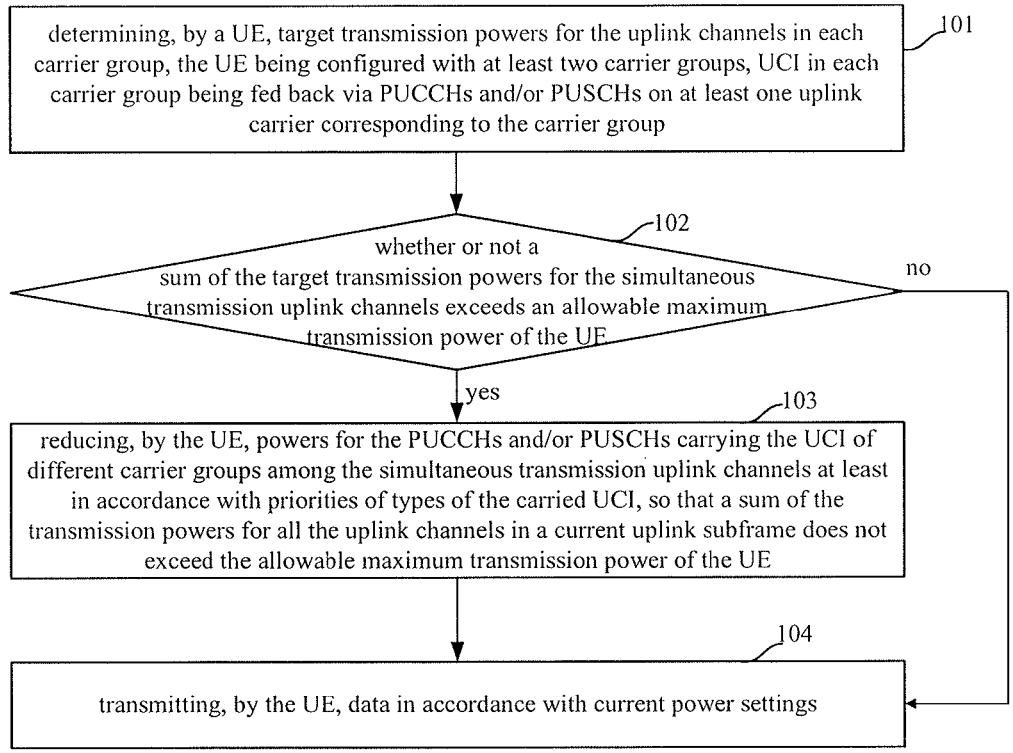
FIG. 1 is a flow chart of a power control method for uplink channels according to one embodiment of the present disclosure.

As shown in FIG. 1, which is a flow chart of a power control method for uplink channels implemented at a UE side, the power control method may include following steps.

Step 101 is to determine, by a UE, target transmission powers of uplink channels in each carrier group. The UE is configured with at least two carrier groups, and UCI in each carrier group is fed back via a PUCCH and/or a PUSCH on at least one uplink carrier corresponding to the carrier group.

Step 102 is to determine, by the UE, whether or not a sum of the target transmission powers for the simultaneous transmission uplink channels exceeds an allowable maximum transmission power of the UE; if determining that the sum of the target transmission powers for the simultaneous transmission uplink channels exceeds the allowable maximum transmission power of the UE, to perform step 103.

Here, the so-called "simultaneous transmission" refers to the existence of overlapping uplink channels at a moment for transmission, e.g., the uplink channels within an identical uplink subframe in the case of frame timing synchronization between different carrier groups, or the uplink channels at an identical moment for transmission in the case of frame timing asynchronization between different carrier groups.

Step 103 is to reduce, by the UE, powers for the PUCCH(s) and/or PUSCH(s) carrying the UCI of different carrier groups among the simultaneous transmission uplink channels at least in accordance with priorities of types of the carried UCI, so that a sum of the transmission powers for all the uplink channels in a current uplink subframe does not exceed the allowable maximum transmission power of the UE.

Further, after the power adjustment in Step 103, the UE may transmit data in accordance with the adjusted powers (Step 104 in FIG. 1).

Further, if the UE determines that the sum of the target transmission powers for the simultaneous transmission uplink channels does not exceed the allowable maximum transmission power of the UE in Step 102, the UE may transmit the data in accordance with current power settings (Step 104 in FIG. 1).

In Step 103 shown in FIG. 1, the UE may reduce the power on the basis of predetermined priority policies. Depending on the different predetermined priority policies, the step of reducing the powers in accordance with the priorities of the types of the UCI may include one of the following circumstances.

(1) Reducing the powers in accordance with the priorities of the types of the UCI The types of the UCI refer to different contents contained in the UCI. For example, depending on the different contents contained in the UCI, the UCI may be an SR, an ACK/NACK or CSI. The priorities of the types of the UCI include that a priority of the SR≥a priority of the ACK/NACK>a priority of the CSI.

Alternatively, in the case that the CSI includes periodic CSI and aperiodic CSI, a priority of the aperiodic CSI>a priority of the periodic CSI.

(2) Reducing the powers in accordance with the priorities of the types of the UCI and priorities of carriers The priorities of the carriers include that a priority of a PCC>a priority of any other component carrier, or, a priority of carriers in a carrier group that includes a PCC>a priority of carriers in a carrier group that does not include a PCC, or, a priority of a PCC>a priority of any other component carrier and a priority of carriers in a carrier group that includes a PCC>a priority of carriers in a carrier group that does not include a PCC.

(3) Reducing the powers in accordance with the priorities of the types of the UCI and priorities of channels The priorities of the channels may include one of the following circumstances or any possible combination thereof: (i) a priority of the PUCCH>a priority of the PUSCH; (ii) the priority of the PUCCH>a priority of the PUSCH with UCI>a priority of the PUSCH without UCI; (iii) in the case that the current subframe includes a PRACH, a priority of the PRACH≥the priority of the PUCCH>the priority of the PUSCH; and (iv) in the case that the current subframe includes the PRACH, the priority of the PRACH- ≥the priority of the PUCCH>the priority of the PUSCH with UCI>the priority of the PUSCH without UCI.

Alternatively, on the basis of the above-mentioned predetermined priorities of the channels, in the case that the current subframe further includes a Sounding Reference Signal (SRS), the SRS has the lowest priority.

(4) Reducing the powers in accordance with the priorities of the types of the UCI, the priorities of the carriers and the priorities of the channels In other words, the priorities of the types of the UCI, the priorities of the carriers and the priorities of the channels may be combined together and used in a certain priority order, e.g., the priorities of the types of the UCI may be used at first, then the priorities of the carriers may be used on the basis of the priorities of the types of the UCI, and then the priorities of the channels may be used on the basis of the priorities of the types of the UCI and the priorities of the carriers. In this way, it is able to acquire various priority combinations.

The step of reducing the powers will be described hereinafter in accordance with the above four priority policies.

(1) Reducing the powers in accordance with the priorities of the types of the UCI The step of reducing the powers in accordance with the priorities of the types of the UCI may include: determining power allocation priorities in accordance with the priorities of the types of the carried UCI so as to acquire a scheme A for the determined power allocation priorities, and reducing the powers of the PUCCH(s) and/or PUSCH(s) in an ascending order of the power allocation priorities in accordance with the scheme A.

Alternatively, the scheme A for the power allocation priorities may include that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI.

Alternatively, on the basis of the scheme A, it may be further specified that the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

For example, the PUCCH(s) with the SR have an identical power allocation priority, the PUCCH(s) with the ACK/NACK have an identical power allocation priority, the PUSCH(s) with the ACK/NACK have an identical power allocation priority, the PUCCH(s) with the ACK/NACK and the PUSCH(s) with the ACK/NACK have an identical power allocation priority, the PUCCHs with the CSI have an identical power allocation priority, the PUSCHs with the CSI have an identical power allocation priority, and the PUCCH(s) with the CSI and the PUSCH(s) carry the CSI have an identical power allocation priority.

Correspondingly, the step of reducing the powers for the PUCCH(s) and/or PUSCH(s) in an ascending order of the power allocation priorities in accordance with the scheme A may include the following steps (according to the practical need, in the following, some of the steps may be omitted, e.g., in the absence of the PUSCH(s) that do not carry the UCI, the step of reducing the powers for the PUSCH without UCI may not be performed, and in the absence of the PUCCH(s) and PUSCH(s) that do not carry the ACK/NACK, the step of reducing the powers for the PUCCH(s) and PUSCH(s) that do not carry the ACK/NACK may be omitted).

(i) Reducing the transmission power for the PUSCH without UCI and maintaining the transmission power for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission of the UE, further reducing the transmission power for the PUCCH and/or PUSCH with the CSI (the phrase "and/or" used herein refers to that merely the PUCCH, merely the PUSCH, or a combination thereof is currently used for transmission), and maintaining the transmission power for the remaining channels. In the presence of the PUCCH(s) and/or PUSCH(s) with the CSI, the powers for these PUCCH(s) and/or PUSCH(s) may be reduced with equal proportion.

(iii) In the case that the transmission powers for the PUCCH and the PUSCH with the CSI is reduced to 0 (the word "and" used herein refer to that the transmission powers for all the channels with an identical priority is reduced to 0, and the PUCCH, or the PUSCH, or a combination thereof may be currently used for transmission) and the total transmission power of the UE still exceeds the allowable maximum transmission power of the UE, further reducing the transmission powers for the PUCCH and/or PUSCH with the ACK/NACK, and maintaining the transmission powers for the remaining channels. In the presence of the PUCCH(s) and/or PUSCH(s) with the ACK/NACK, the powers of these PUCCH(s) and/or PUSCH(s) may be reduced with equal proportion.

(iv) In the case that the transmission powers for the PUCCH and the PUSCH with the ACK/NACK is reduced to 0 and the total transmission power of the UE still exceeds the allowable maximum transmission power of the UE, further reducing the transmission powers for the PUCCH with the SR, and maintaining the transmission powers for the remaining channels. In the presence of the PUCCH(s) with the SR, the powers for these PUCCH(s) may be reduced with equal proportion.

(2) Reducing the powers in accordance with the priorities of the types of the UCI and the priorities of the carriers The step of reducing the powers in accordance with the priorities of the types of the UCI and the priorities of the carriers may include: determining power allocation priorities in accordance with the priorities of the types of the UCI and the priorities of the carriers so as to acquire a scheme B or a scheme C, and reducing the powers of the PUCCH(s) and/or PUSCH(s) in an ascending order of the power allocation priorities in accordance with the scheme B or scheme C.

Alternatively, the scheme B may be determined by ranking the priorities of the types of the UCI and then ranking the priorities of the carriers, and the definition of the priorities of the carriers may refer to the contents described hereinbefore (i.e., there are two circumstances for the priorities of the carriers). The scheme B determined in this way may include that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and (alternatively, for the PUCCH(s) with at least the UCI of an identical type and/or PUSCH(s) with at least the UCI of an identical type) power allocation priorities of the PUCCH(s) and the PUSCH(s) with UCI of the carrier group including the PCC>power allocation priorities of the PUCCH(s) with UCI of the carrier group not including the PCC and PUSCH(s) with UCI of the carrier group not including the PCC.

Alternatively, the scheme B may include that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and (alternatively, for the PUCCH(s) with at least the UCI of an identical type and/or PUSCH(s) with at least the UCI of an identical type) power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC.

Alternatively, it may also be specified in the scheme B that, for the PUCCH(s) with UCI of the carrier group not including the PCC and PUSCH(s) with UCI of the carrier group not including the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority. Alternatively, it may also be specified in the scheme B that, for the PUCCH(s) with UCI not including the UCI of the PCC and PUSCH(s) with UCI not including the UCI of the PCC, the PUCCHs with at least the UCI of an identical type have an identical power allocation priority, the PUSCHs with at least the UCI of an identical type have an identical power allocation priority, and the PUCCH(s) with at least the UCI of an identical type and PUSCH(s) with at least the UCI of an identical type have an identical power allocation priority.

For example, in a first form, the scheme B includes that a power allocation priority of the PUCCH with SR of the carrier group including the PCC>a power allocation priority of the PUCCH with SR of the carrier group not including the PCC≥power allocation priorities of the PUCCH and the PUSCH with the ACK/NACK for the carrier group including the PCC>power allocation priorities of the PUCCH and the PUSCH with the ACK/NACK for the carrier group not including the PCC>power allocation priorities of the PUCCH with CSI and PUSCH with CSI for the carrier group including the PCC>power allocation priorities of the PUCCH with CSI and PUSCH with CSI for the carrier group not including the PCC>a power allocation priority of the PUSCH without UCI.

Alternatively, in the first form, in the presence of the PUCCH(s) with the SR of the carrier group not including the PCC, these PUCCH(s) have an identical power allocation priority. In the presence of the PUCCH(s) with the ACK/NACK for the carrier group not including the PCC, these PUCCH(s) have an identical power allocation priority. In the presence of the PUSCH(s) with the ACK/NACK for the carrier group not including the PCC, these PUSCH(s) have an identical power allocation priority. In the presence of the PUCCH(s) and PUSCH(s) with the ACK/NACK for the carrier group not including the PCC, these PUCCH(s) and PUSCH(s) have an identical power allocation priority. In the presence of the PUCCH(s) with the CSI for the carrier group not including the PCC, these PUCCH(s) have an identical power allocation priority. In the presence of the PUSCH(s) with the CSI for the carrier group not including the PCC, these PUSCH(s) have an identical power allocation priority. In the presence of the PUCCH(s) and PUSCH(s) with the CSI for the carrier group not including the PCC, these PUCCH(s) and PUSCH(s) have an identical power allocation priority.

The step of reducing the powers for the PUCCH(s) and/or PUSCH(s) in the ascending order of the power allocation priorities in accordance with the first form of the scheme B may include the following steps.

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission powers for the PUCCH(s) and/or PUSCH(s) with the CSI, and maintaining the transmission powers for the remaining channels. To be specific, 1) in the case that the PUCCH(s) and/or PUSCH(s) with the CSI include both the PUCCH(s) and/or PUSCH(s) with the CSI for the carrier group including the PCC and the PUCCH(s) and/or PUSCH(s) with the CSI for the carrier group not including the PCC, the transmission powers for the PUCCH(s) and/or PUSCH(s) with the CSI for carrier group not including the PCC may be reduced at first, and the transmission powers for the remaining channels may be maintained. At this time, in the presence of the PUCCH(s) and/or PUSCH(s) with the CSI for the carrier group not including the PCC, the powers for these PUCCH(s) and/or PUSCH(s) may be reduced with equal proportion. In the case that the transmission powers for the PUCCH(s) and/or PUSCH(s) with the CSI for the carrier group not including the PCC is reduced to 0 and the total transmission power of the UE still exceeds the allowable maximum transmission power of the UE, the transmission powers for the PUCCH and/or PUSCH with the CSI for the carrier group including the PCC may be further reduced, and this time, in the presence of the PUCCH(s) and/or PUSCH(s) with the CSI for the carrier group including the PCC, the powers for these PUCCH(s) and/or PUSCH(s) may be reduced with equal proportion. 2) In the case that the PUCCH(s) and/or PUSCH(s) with the CSI merely include the PUCCH(s) and/or PUSCH(s) with the CSI for the carrier group including the PCC or merely include the PUCCH(s) and/or PUSCH(s) with the CSI for the carrier group not including the PCC, the powers for these PUCCH(s) and/or PUSCH(s) may be reduced with equal proportion.

(iii) In the case that the transmission powers for the PUCCH(s) and the PUSCH(s) with the CSI is reduced to 0 and the total transmission power of the UE still exceeds the allowable maximum transmission power of the UE, further reducing the transmission powers for the PUCCH(s) and/or PUSCH(s) with the ACK/NACK, and maintaining the transmission powers for the remaining channels. To be specific, 1) in the case that the PUCCH(s) and/or PUSCH(s) with the ACK/NACK include both the PUCCH(s) and/or PUSCH(s) with UCI of the carrier group including the PCC and the PUCCH(s) and/or PUSCH(s) with the ACK/NACK for the carrier group not including the PCC, the transmission powers for the PUCCH and/or PUSCH with ACK/NACK for the carrier group not including the PCC may be reduced at first, and the transmission powers for the remaining channels may be maintained. At this time, in the presence of the PUCCH(s) and/or PUSCH(s) with the ACK/NACK for the carrier group not including the PCC, the powers for these PUCCH(s)

and/or PUSCH(s) may be reduced with equal proportion. In the case that the transmission powers for the PUCCH and PUSCH with the ACK/NACK for the carrier group not including the PCC is reduced to 0 and the total transmission power of the UE still exceeds the allowable maximum transmission power of the UE, the transmission powers for the PUCCH and/or PUSCH with the ACK/NACK for the carrier group including the PCC may be further reduced, and at this time, in the presence of the PUCCH(s) and/or PUSCH(s) with the ACK/NACK for the carrier group including the PCC, the powers for these PUCCH(s) and/or PUSCH(s) may be reduced with equal proportion. 2) In the case that the PUCCH(s) and/or PUSCH(s) with the ACK/NACK merely include the PUCCH(s) and/or PUSCH(s) with the ACK/NACK for the carrier group including the PCC or merely include the PUCCH(s) and/or PUSCH(s) with the ACK/NACK for the carrier group not including the PCC, the powers for these PUCCH(s) and/or PUSCH(s) may be reduced with equal proportion.

(iv) In the case that the transmission powers for the PUCCH(s) and PUSCH(s) with the ACK/NACK is reduced to 0 and the total transmission power of the UE still exceeds the allowable maximum transmission power of the UE, further reducing the transmission power for the PUCCH with SR, and maintaining the transmission powers for the remaining channels. To be specific, 1) in the case that the PUCCH(s) with the SR include both the PUCCH with SR of the carrier group including the PCC and the PUCCH with SR of the carrier group not including the PCC, the transmission power for the PUCCH with SR of the carrier group not including the PCC may be reduced at first, and the transmission powers for the remaining channels may be maintained. At this time, in the presence of the PUCCH(s) with the SR of the carrier group not including the PCC, the powers for these PUCCH(s) may be reduced with equal proportion. In the case that the transmission power for the PUCCH with SR of the carrier group not including the PCC is reduced to 0 and the total transmission power of the UE still exceeds the allowable maximum transmission power of the UE, the power transmission for the PUCCH with SR of the carrier group including the PCC may be further reduced, and at this time, in the presence of the PUCCH(s) with the SR of the carrier group including the PCC, the powers for these PUCCH(s) may be reduced with equal proportion. 2) In the case that the PUCCH(s) with the SR merely include the PUCCH(s) with the SR of the carrier group including the PCC or merely include the PUCCH(s) with the SR of the carrier group not including the PCC, the powers for these PUCCH(s) may be reduced with equal proportion.

In a second form, the scheme B includes that a power allocation priority of the PUCCH with SR including the PCC>a power allocation priority of the PUCCH with SR not including the PCC≥power allocation priorities of the PUCCH with ACK/NACK and PUSCH with ACK/NACK including the PCC>power allocation priorities of the PUCCH with ACK/NACK and PUSCH with ACK/NACK not including the PCC>power allocation priorities of the PUCCH with CSI and PUSCH with CSI including the PCC>power allocation priorities of the PUCCH with CSI and PUSCH with CSI not including the PCC>a power allocation priority of the PUSCH without UCI.

Alternatively, in the second form of the scheme B, in the presence of the PUCCH(s) with the SR not including the PCC, these PUCCH(s) may have an identical power allocation priority; in the presence of the PUCCCHs with the ACK/NACK not including the PCC, these PUCCH(s) may have an identical power allocation priority; in the presence of the PUSCH(s) with the ACK/NACK not including the PCC, these PUSCH(s) may have an identical power allocation priority; in the presence of the PUCCH(s) and PUSCH(s) with the ACK/NACK not including the PCC, these PUCCH(s) and PUSCH(s) may have an identical power allocation priority; in the presence of the PUCCH(s) with the CSI not including the PCC, these PUCCH(s) may have an identical power allocation priority; in the presence of the PUSCH(s) with the CSI not including the PCC, these PUSCH(s) may have an identical power allocation priority; and in the presence of the PUCCH(s) and PUSCH(s) with the CSI not including the PCC, these PUCCH(s) and PUSCH(s) may have an identical power allocation priority.

The step of reducing the powers for the PUCCH(s) and/or PUSCH(s) in the ascending order of the power allocation priorities in accordance with the second form of the scheme B may include the following steps.

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission powers for the PUCCH(s) and/or PUSCH(s) with the CSI, and maintaining the transmission powers for the remaining channels. To be specific, 1) in the case that the PUCCH(s) and/or PUSCH(s) with the CSI include both the PUCCH(s) and/or PUSCH(s) with the CSI including the PCC and the PUCCH and/or PUSCH with the CSI not including the PCC, the transmission power for the PUCCH and/or PUSCH with the CSI not including the PCC may be reduced at first, and the transmission powers for the remaining channels may be maintained. At this time, in the presence of the PUCCH(s) and/or PUSCH(s) with the CSI not including the PCC, the power for these PUCCH(s) and/or PUSCH(s) may be reduced with equal proportion. In the case that the transmission power for the PUCCH and PUSCH with the CSI not including the CSI is reduced to 0 and the total transmission power of the UE still exceeds the allowable maximum transmission power of the UE, the transmission power for the PUCCH and/or PUSCH with the CSI including the PCC may be further reduced, and at this time, in the presence of the PUCCH(s) and/or PUSCH(s) with the CSI including the PCC, the powers for these PUCCH(s) and/or PUSCH(s) may be reduced with equal proportion. 2) In the case that the PUCCH(s) and/or PUSCH(s) with the CSI merely include the PUCCH(s) and/or PUSCH(s) with the CSI including the PCC or merely include the PUCCH(s) and/or PUSCH(s) with the CSI not including the PCC, the powers for these PUCCH(s) and/or PUSCH(s) may be reduced with equal proportion.

(iii) In the case that the transmission power for the PUCCH and PUSCH with the CSI is reduced to 0 and the total transmission power of the UE still exceeds the allowable maximum transmission power of the UE, further reducing the transmission power for the PUCCH(s) and/or PUSCH(s) with the ACK/NACK, and maintaining the transmission powers for the remaining channels. To be specific, 1) in the case that the PUCCH(s) and/or PUSCH(s) with the ACK/NACK include both the PUCCH and/or PUSCH with the ACK/NACK including the PCC and the PUCCH and/or PUYCH with the ACK/NACK not including the PCC, transmission power for the PUCCH and/or PUSCH with the ACK/NACK not including the PCC may be reduced at first, and the transmission powers for the remaining channels may be maintained. At this time, in the presence of the PUCCH(s) and/or PUSCH(s) with the ACK/NACK not including the PCC, the powers for these PUCCH(s) and/or PUSCH(s) may be reduced with equal proportion. In the case that the transmission power for the PUCCH and PUSCH with the ACK/NACK not including the PCC is reduced to 0 and the total transmission power of the UE still exceeds the allowable maximum transmission power of the UE, the transmission power for the PUCCH and/or PUSCH with the ACK/NACK including the PCC may be further reduced, and in the presence of the PUCCH(s) and/or PUSCH(s) with the ACK/NACK including the PCC, the powers for these PUCCH(s) and/or PUSCH(s) may be reduced with equal proportion. 2) In the case that the PUCCH(s) and/or PUSCH(s) with the ACK/NACK merely include the PUCCH(s) and/or PUSCH(s) with the ACK/NACK including the PCC or merely include the PUCCH(s) and/or PUSCH(s) with the ACK/NACK not including the PCC, the powers for these PUCCH(s) and/or PUSCH(s) may be reduced with equal proportion.

(iv) in the case that the transmission power for the PUCCH(s) and PUSCH(s) with the ACK/NACK is reduced to 0 and the total transmission power of the UE still exceeds the allowable maximum transmission power of the UE, further reducing the transmission power for the PUCCH(s) with the SR, and maintaining the transmission powers for the remaining channels. To be specific, 1) in the case that the PUCCH(s) with the SR include both the PUCCH with SR including the PCC and the PUCCH with SR not including the PCC, the transmission power for the PUCCH with SR not including the PCC may be reduced at first, and the transmission powers for the remaining channels may be maintained. At this time, in the presence of the PUCCH(s) with the SR not including the PCC, the powers for these PUCCH(s) may be reduced with equal proportion. In the case that the transmission power for the PUCCH(s) with the SR not including the PCC is reduced to 0 and the total transmission power of the UE still exceeds the allowable maximum transmission power of the UE, the transmission power for the PUCCH with SR including the PCC may be further reduced, and in the presence of the PUCCH(s) with the SR including the PCC, the powers for these PUCCH(s) may be reduced with equal proportion. 2) In the case that the PUCCH(s) with the SR merely include the PUCCH(s) with the SR including the PCC or merely include the PUCCH(s) with the SR not including the PCC, the powers for these PUCCH(s) may be reduced with equal proportion.

Alternatively, the scheme C may be determined by ranking the priorities of the carriers and then ranking the priorities of the UCI, and the definition of the priorities of the carriers may refer to the contents described hereinbefore (i.e. there are two circumstances for the priorities of the carriers). The scheme C determined in this way may include that power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC. For the PUCCH(s) with UCI of the carrier group including the PCC and PUSCH(s) with UCI of the carrier group including the PCC, the scheme C may include that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI. For the PUCCH(s) with UCI of the carrier group not including PCC and PUSCH(s) with UCI of the carrier group not including PCC, the scheme C may include that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI.

Alternatively, for the PUCCH(s) with UCI of the carrier group not including the PCC and PUSCH(s) with UCI of the carrier group not including the PCC, it may be further specified in the scheme C that, in the presence of the PUCCH(s) with at least the UCI of an identical type, these PUCCH(s) have an identical power allocation priority; in the presence of the PUSCH(s) with at least the UCI of an identical type, these PUSCH(s) have an identical power allocation priority; and in the presence of the PUCCH(s) with at least the UCI of an identical type and PUSCH(s) with at least the UCI of an identical type, these PUCCH(s) and PUSCH(s) have an identical power allocation priority.

The scheme C may further include that power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC. For the PUCCH(s) with UCI including the UCI of the PCC and PUSCH(s) with UCI including the UCI of the PCC, the scheme C may include that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI. For the PUCCH(s) with UCI not including the UCI of the PCC and PUSCH(s) with UCI not including the UCI of the PCC, the scheme C may include that a power allocation priority of the PUCCH with SR≥power allocation priorities of the PUCCH(s) with ACK/NACK and PUSCH(s) with ACK/NACK>power allocation priorities of the PUCCH(s) with CSI and PUSCH(s) with CSI>a power allocation priority of the PUSCH without UCI.

Alternatively, for the PUCCH(s) with UCI not including the UCI of the PCC and PUSCH(s) with UCI not including the UCI of the PCC, it may be further specified in the scheme C that, in the presence of the PUCCH(s) with at least the UCI of an identical type, the PUCCH(s) have an identical power allocation priority; in the presence of the PUSCH(s) with at least the UCI of an identical type, the PUSCH(s) have an identical power allocation priority; and in the presence of the PUCCH(s) with at least the UCI of an identical type and PUSCH(s) with at least the UCI of an identical type, the PUCCH(s) and PUSCH(s) have an identical power allocation priority.

For example, in a first form, the scheme C includes that a power allocation priority of the PUCCH with SR of the carrier group including the PCC>power allocation priorities of the PUCCH with ACK/NACK and PUSCH with ACK/NACK for the carrier group including the PCC>power allocation priorities of the PUCCH with CSI and PUSCH with CSI including the PCC>a power allocation priority of the PUCCH with SR of the carrier group not including the PCC≥power allocation priorities of the PUCCH with ACK/NACK and PUSCH with ACK/NACK for the carrier group not including the PCC>power allocation priorities of the PUCCH with CSI and PUSCH with CSI for the carrier group not including the PCC>a power allocation priority of the PUSCH without UCI.

Alternatively, in the first form of the scheme C, in the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUSCH(s) with the ACK/NACK for the carrier group not including the PCC, these PUSCH(s) have an identical power allocation priority; in the presence of the PUCCH(s) and PUSCH(s) with the ACK/NACK for the carrier group not including the PCC, these PUCCH(s) and PUSCH(s) have an identical power allocation priority; in the presence of the PUCCH(s) with the CSI for the carrier group not including the PCC, these PUCCH(s) have an identical power allocation priority; in the presence of the PUSCH(s) with the CSI for the carrier group not including the PCC, these PUSCH(s) have an identical power allocation priority; and in the presence of the PUCCH(s) and PUSCH(s) with the CSI for the carrier group not including the PCC, these PUCCH(s) and PUSCH(s) have an identical power allocation priority.

The step of reducing the powers for the PUCCH(s) and/or PUSCH(s) in the ascending order of the power allocation priorities in accordance with the first form of the scheme C may include the following steps (according to the practical need, in the following, some of the steps may be omitted, e.g., in the absence of the PUSCH(s) that do not carry the UCI, the step of reducing the powers for these PUSCH(s) may not be performed, and in the absence of the PUCCH(s) with the SR of the carrier group not including the PCC, the step of reducing the powers for these PUCCH(s) may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power for the PUCCH and/or PUSCH with the CSI for the carrier group not including the PCC, and maintaining the transmission powers for the remaining channels. In the presence of the PUCCH(s) and/or PUSCH(s) with the CSI for the carrier group not including the PCC, the powers for these PUCCH(s) and/or PUSCH(s) may be reduced with equal proportion.

(iii) In the case that the transmission power for the PUCCH and PUSCH with the CSI for the carrier group not including the PCC is reduced to 0 and the total transmission power of the UE still exceeds the allowable maximum transmission power of the UE, further reducing the transmission power for the PUCCH and/or PUSCH with the ACK/NACK for the carrier group not including the PCC, and maintaining the transmission powers for the remaining channels. In the presence of the PUCCH(s) and/or PUSCH(s) with the ACK/NACK for the carrier group not including the PCC, the powers for these PUCCH(s) and/or PUSCH(s) may be reduced with equal proportion.

(iv) In the case that the transmission power for the PUCCH and PUSCH with the ACK/NACK for the carrier group not including the PCC is reduced to 0 and the total transmission power of the UE still exceeds the allowable maximum transmission power of the UE, further reducing the transmission power for the PUCCH with SR of the carrier group not including the PCC, and maintaining the transmission powers for the remaining channels. In the presence of the PUCCH(s) with the SR of the carrier group not including the PCC, the powers for these PUCCH(s) may be reduced with equal proportion.

(v) In the case that the transmission power for the PUCCH with SR of the carrier group not including the PCC is reduced to 0 and the total transmission power of the UE still exceeds the allowable maximum transmission power of the UE, further reducing the transmission power for the PUCCH and/or PUSCH with the CSI for the carrier group including the PCC, and maintaining the transmission powers for the remaining channels. In the presence of the PUCCH(s) and/or PUSCH(s) with the CSI for the carrier group including the PCC, the powers for these PUCCH(s) and/or PUSCH(s) may be reduced with equal proportion.

(vi) In the case that the transmission power for the PUCCH and PUSCH with the CSI for the carrier group including the PCC is reduced to 0 and the total transmission power of the UE still exceeds the allowable maximum transmission power of the UE, further reducing the transmission power for the PUCCH and/or PUSCH with the ACK/NACK for the carrier group including the PCC, and maintaining the transmission powers for the remaining channels. In the presence of the PUCCH(s) and/or PUSCH(s) with the ACK/NACK for the carrier group including the PCC, the powers for these PUCCH(s) and/or PUSCH(s) may be reduced with equal proportion.

(vii) In the case that the transmission power for the PUCCH and PUSCH with the ACK/NACK for the carrier group including the PCC is reduced to 0 and the total transmission power of the UE still exceeds the allowable maximum transmission power of the UE, further reducing the transmission power for the PUCCH with SR of the carrier group including the PCC, and maintaining the transmission powers for the remaining channels. In the presence of the PUCCH(s) with the SR of the carrier group including the PCC, the powers for these PUCCH(s) may be reduced with equal proportion.

In a second form, the scheme C includes that a power allocation priority of the PUCCH with SR including the PCC>power allocation priorities of the PUCCH with ACK/NACK and PUSCH with ACK/NACK including the PCC>power allocation priorities of the PUCCH with CSI and PUSCH with CSI including the PCC>a power allocation priority of the PUCCH with SR not including the PCC≥power allocation priorities of the PUCCH with ACK/NACK and PUSCH with ACK/NACK not including the PCC>power allocation priorities of the PUCCH with CSI and PUSCH with CSI not including the PCC>a power allocation priority of the PUSCH without UCI.

Alternatively, in the second form of the scheme C, in the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUSCH(s) with the ACK/NACK not including the PCC, these PUSCH(s) have an identical power allocation priority; in the presence of the PUCCH(s) and PUSCH(s) with the ACK/NACK not including the PCC, these PUCCH(s) and PUSCH(s) have an identical power allocation priority; in the presence of the PUCCH(s) with the CSI not including the PCC, these PUCCH(s) have an identical power allocation priority; in the presence of the PUSCH(s) with the CSI not including the PCC, these PUSCH(s) have an identical power allocation priority; and in the presence of the PUCCH(s) and PUSCH(s) with the CSI not including the PCC, these PUCCH(s) and PUSCH(s) have an identical power allocation priority.

The step of reducing the powers for the PUCCH(s) and/or PUSCH(s) in the ascending order of the power allocation priorities in accordance with the second form of the scheme C may include the following steps (according to the practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power for the PUCCH and/or PUSCH with the CSI not including the PCC, and maintaining the transmission powers for the remaining channels. In the presence of the PUCCH(s) and/or PUSCH(s) with the CSI not including the PCC, the powers for these PUCCH(s) and/or PUSCH(s) may be reduced with equal proportion.

(iii) In the case that the transmission power for the PUCCH and PUSCH with the CSI not including the PCC and the total transmission power of the UE still exceeds the allowable maximum transmission power of the UE, further reducing the transmission power for the PUCCH and/or PUSCH with the ACK/NACK not including the PCC, and maintaining the transmission powers for the remaining channels. In the presence of the PUCCH(s) and/or PUSCH(s) with the ACK/NACK not including the PCC, the powers for these PUCCH(s) and/or PUSCH(s) may be reduced with equal proportion.

(iv) In the case that the transmission power for the PUCCH and PUSCH with the ACK/NACK not including the PCC is reduced to 0 and the total transmission power of the UE still exceeds the allowable maximum transmission power of the UE, further reducing the transmission power for the PUCCH with SR not including the PCC, and maintaining the transmission powers for the remaining channels. In the presence of the PUCCH(s) with the SR not including the PCC, the powers for these PUCCH(s) may be reduced with equal proportion.

(v) In the case that the transmission power for the PUCCH with SR not including the PCC is reduced to 0 and the total transmission power of the UE still exceeds the allowable maximum transmission power of the UE, further reducing the transmission power for the PUCCH and/or PUSCH with the CSI including the PCC, and maintaining the transmission powers for the remaining channels. In the presence of the PUCCH(s) and/or PUSCH(s) with the CSI including the PCC, the powers for these PUCCH(s) and/or PUSCH(s) may be reduced with equal proportion.

(vi) In the case that the transmission power for the PUCCH and PUSCH with the CSI including the PCC is reduced to 0 and the total transmission power of the UE still exceeds the allowable maximum transmission power of the UE, further reducing the transmission power for the PUCCH and/or PUSCH with the ACK/NACK including the PCC, and maintaining the transmission powers for the remaining channels. In the presence of the PUCCH(s) and/or PUSCH(s) with the ACK/NACK including the PCC, the powers for these PUCCH(s) and/or PUSCH(s) may be reduced with equal proportion.

(vii) In the case that the transmission power for the PUCCH and PUSCH with the ACK/NACK including the PCC is reduced to 0 and the total transmission power of the UE still exceeds the allowable maximum transmission power of the UE, further reducing the transmission power for the PUCCH with SR including the PCC, and maintaining the transmission powers for the remaining channels. In the presence of the PUCCH(s) with the SR including the PCC, the powers for these PUCCH(s) may be reduced with equal proportion.

(3) Reducing the powers in accordance with the priorities of the types of the UCI and the priorities of the channels The step of reducing the powers in accordance with the priorities of the types of the UCI and the priorities of the channels may include: determining power allocation priorities in accordance with the priorities of the types of the UCI and the priorities of the channels so as to acquire a scheme D or a scheme E, and reducing the power of the PUCCH(s) and/or PUSCH(s) in an ascending order of the power allocation priorities in accordance with the scheme D or scheme E.

Alternatively, the scheme D may be determined by ranking the priorities of the types of the UCI and then ranking the priorities of the channels. The scheme D determined in this way may include that a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and (for the PUCCH(s) with at least the UCI of an identical type and PUSCH(s) with at least the UCI of an identical type) the scheme D includes that a power allocation priority of the PUCCH with UCI>a power allocation priority of the PUSCH with UCI.

Alternatively, it may be further specified in the scheme D that the PUCCHs with at least the UCI of an identical type have an identical power allocation priority, and the PUSCHs with at least the UCI of an identical type have an identical power allocation priority.

For example, one form of the scheme D includes that a power allocation priority of the PUCCH with SR≥a power allocation priority of the PUCCH with ACK/NACK>a power allocation priority of the PUSCH with ACK/NACK>a power transmission priority of the PUCCH with CSI>a power transmission power priority of the PUSCH with CSI>a power allocation priority of the PUSCH without UCI.

Alternatively, in the above form of the scheme D, the PUCCH(s) with the SR have an identical power allocation priority, the PUCCH(s) with the ACK/NACK have an identical power allocation priority, the PUSCH(s) with the ACK/NACK have an identical power allocation priority, the PUCCH(s) with the CSI have an identical power allocation priority, and the PUSCH(s) with the CSI have an identical power allocation priority.

The step of reducing the powers for the PUCCH(s) and/or PUSCH(s) in the ascending order of the power allocation priorities in accordance with the above form of the scheme D may include the following steps (according to the practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power for the PUSCH with CSI, and maintaining the transmission powers for the remaining channels. In the presence of the PUSCH(s) with the CSI, the powers for these PUSCH(s) may be reduced with equal proportion.

(iii) In the case that the transmission power for the PUSCH with CSI is reduced to 0 and the total transmission power of the UE still exceeds the allowable maximum transmission power of the UE, further reducing the transmission power for the PUCCH with CSI, and maintaining the transmission powers for the remaining channels. In the presence of the PUCCH(s) with the CSI, the powers for these PUCCH(s) may be reduced with equal proportion.

(iv) In the case that the transmission power for the PUCCH with CSI is reduced to 0 and the total transmission power of the UE still exceeds the allowable maximum transmission power of the UE, further reducing the transmission power for the PUSCH with ACK/NACK, and maintaining the transmission powers for the remaining channels. In the presence of the PUSCH(s) with the ACK/NACK, the powers for these PUSCH(s) may be reduced with equal proportion.

(v) In the case that the transmission power for the PUSCH with ACK/NACK is reduced to 0 and the total transmission power of the UE still exceeds the allowable maximum transmission power of the UE, further reducing the transmission power for the PUCCH with ACK/NACK, and maintaining the transmission powers for the remaining channels. In the presence of the PUCCH(s) with the ACK/NACK, the powers for these PUCCH(s) may be reduced with equal proportion.

(vi) In the case that the transmission power for the PUCCH with ACK/NACK is reduced to 0 and the total transmission power of the UE still exceeds the allowable maximum transmission power of the UE, further reducing the transmission for the PUCCH with SR. In the presence of the PUCCH(s) with the SR, the powers for these PUCCH(s) may be reduced with equal proportion.

Alternatively, the scheme E may be determined by ranking the priorities of the channels and then ranking the priorities of the types of the IC. The scheme E determined in this way may include that: a power allocation priority of the PUCCH with SR≥a power allocation priority of the PUCCH with ACK/NACK>a power allocation priority of the PUCCH with CSI; a power allocation priority of the PUSCH with ACK/NACK>a power allocation priority of the PUSCH with CSI>a power allocation priority of the PUSCH that does not carry the UC; and a power allocation priority of the PUCCH with UCI>a power allocation priority of the PUSCH with UCI.

Alternatively, it may be further specified in the scheme E that the PUCCHs with at least the UCI of an identical type have an identical power allocation priority, and the PUSCHs with at least the UCI of an identical type have an identical power allocation priority.

For example, one form of the scheme E includes that a power allocation priority of the PUCCH with SR≥a power allocation priority of the PUCCH with ACK/NACK>a power allocation priority of the PUCCH with CSI>a power allocation priority of the PUSCH with ACK/NACK>a power allocation priority of the PUSCH with CSI>a power allocation priority of the PUSCH without UCI.

Alternatively, in the above form of the scheme E, the PUCCH(s) with the SR have an identical power allocation priority, the PUCCH(s) with the ACK/NACK have an identical power allocation priority, the PUSCH(s) with the ACK/NACK have an identical power allocation priority, the PUCCH(s) with the CSI have an identical power allocation priority, and the PUSCH with the CSI have an identical power allocation priority.

The step of reducing the power for the PUCCH(s) and/or PUSCH(s) in the ascending order of the power allocation priorities in accordance with the above form of the scheme E may include the following steps (according to the practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power for the PUSCH with CSI, and maintaining the transmission powers for the remaining channels. In the presence of the PUSCH(s) with the CSI, the powers for these PUSCH(s) may be reduced with equal proportion.

(iii) In the case that the transmission power for the PUSCH with CSI is reduced to 0 and the total transmission power of the UE still exceeds the allowable maximum transmission power of the UE, further reducing the transmission power for the PUSCH with ACK/NACK, and maintaining the transmission powers for the remaining channels. In the presence of the PUSCH(s) with the ACK/NACK, the powers for these PUSCH(s) may be reduced with equal proportion.

(iv) In the case that the transmission power for the PUSCH with ACK/NACK is reduced to 0 and the total transmission power of the UE still exceeds the allowable maximum transmission power of the UE, further reducing the transmission power for the PUCCH with CSI, and maintaining the transmission powers for the remaining channels. In the presence of the PUCCH(s) with the CSI, the powers for these PUCCH(s) may be reduced with equal proportion.

(v) In the case that the transmission power for the PUCCH with CSI is reduced to 0 and the total transmission power of the UE still exceeds the allowable maximum transmission power of the UE, further reducing the transmission power for the PUCCH with ACK/NACK, and maintaining the transmission powers for the remaining channels. In the presence of the PUCCH(s) with the ACK/NACK, the powers for these PUCCH(s) may be reduced with equal proportion.

(vi) In the case that the transmission power for the PUCCH with ACK/NACK is reduced to 0 and the total transmission power of the UE still exceeds the allowable maximum transmission power of the UE, further reducing the transmission power for the PUCCH with SR. In the presence of the PUCCH(s) with the SR, the powers for these PUCCH(s) may be reduced with equal proportion.

(4) Reducing the powers in accordance with the priorities of the types of the UCI, the priorities of the carriers and the priorities of the channels The step of reducing the powers in accordance with the priorities of the types of the UCI, the priorities of the carriers and the priorities of the channels may include: determining power allocation priorities in accordance with the priorities of the types of the UCI, the priorities of the carriers and the priorities of the channels so as to acquire a scheme F, a scheme G, a scheme H, a scheme I, a scheme J or a scheme K, and reducing the power of the PUCCH(s) and/or PUSCH (s) in an ascending order of the power allocation priorities in accordance with the scheme F, scheme G, scheme H, scheme I, scheme J or scheme K.

Alternatively, the scheme F may be determined by ranking the priorities of the types of the UCI, then ranking the priorities of the carriers and then ranking the priorities of the channels. The scheme F determined in this way may include the following two definitions of priorities.

A first definition of priorities of the scheme F may include that: a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and (alternatively, for the PUCCH(s) with at least the UCI of an identical type and/or PUSCH(s) with at least the UCI of an identical type) power allocation priorities of the PUCCH(s) with UCI of the carrier group including the PCC and PUSCH(s) with UCI of the carrier group including the PCC>power allocation priorities of the PUCCH(s) with UCI of the carrier group not including the PCC and PUSCH(s) with UCI of the carrier group not including the PCC, and (alternatively, for the PUCCH(s) with at least the UCI of an identical type of the carrier group including the PCC and PUSCH(s) with at least the UCI of an identical type of the carrier group including the PCC, and the PUCCH(s) with at least the UCI of an identical type of the carrier group not including the PCC and PUSCH(s) with at least the UCI of an identical type of the carrier group not including the PCC), a power allocation priority of the PUCCH with UCI>a power allocation priority of the PUSCH with UCI.

Alternatively, it may be further specified in the scheme F that, in the presence of the PUCCH(s) with at least the UCI of an identical type of the carrier group not including the PCC, the PUCCH(s) have an identical power allocation priority, and in the presence of the PUSCH(s) with at least the UCI of an identical type of the carrier group not including the PCC, the PUSCH(s) have an identical power allocation priority.

A second definition of priorities of the scheme F may include that: a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and (alternatively, for the PUCCH(s) with at least the UCI of an identical type and/or PUSCH(s) with at least the UCI of an identical type) power allocation priorities of the PUCCH(s) with UCI including the UCI of the PCC and PUSCH(s) with UCI including the UCI of the PCC>power allocation priorities of the PUCCH(s) with UCI not including UCI of the PCC and PUSCH(s) with UCI not including UCI of the PCC, and (alternatively, for the PUCCH(s) with at least the UCI of an identical type of the carrier group including the PCC and PUSCH(s) with at least the UCI of an identical type of the carrier group including the PCC, and the PUCCH(s) with at least the UCI of an identical type of the carrier group not including the PCC and PUSCH(s) with at least the UCI of an identical type of the carrier group not including the PCC) a power allocation priority of the PUCCH with UCI>a power allocation priority of the PUSCH with UCI.

Alternatively, it may be further specified in the scheme F that, in the presence of the PUCCH(s) with at least the UCI of an identical type not including the PCC, the PUCCH(s) have an identical power allocation priority, and in the presence of the PUSCH(s) with at least the UCI of an identical type not including the PCC, the PUSCH(s) have an identical power allocation priority.

For example, in a first form, the scheme F includes that: a power allocation priority of the PUCCH with SR of the carrier group including the PCC>a power allocation priority of the PUCCH with SR of the carrier group not including the PCC≥a power allocation priority of the PUCCH with ACK/NACK for the carrier group including the PCC>a power allocation priority of the PUSCH with ACK/NACK for the carrier group including the PCC>a power allocation priority of the PUCCH with ACK/NACK for the carrier group not including the PCC>a power allocation priority of the PUSCH with ACK/NACK for the carrier group not including the PCC>a power allocation priority of the PUCCH with CSI for the carrier group including the PCC>a power allocation priority of the PUSCH with CSI for the carrier group including the PCC>a power allocation priority of the PUCCH with CSI for the carrier group not including the PCC>a power allocation priority of the PUSCH with CSI for the carrier group not including the PCC>a power allocation priority of the PUSCH without UCI.

Alternatively, in the first form of the scheme F, in the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUCCH(s) with the CSI for the carrier group not including the PCC, these PUCCH(s) have an identical power allocation priority; in the presence of the PUSCH(s) with the ACK/NACK for the carrier group not including the PCC, these PUSCH(s) have an identical power allocation priority; and in the presence of the PUSCH(s) with the CSI for the carrier group not including the PCC, these PUSCH(s) have an identical power allocation priority.

The step of reducing the powers for the PUCCH(s) and/or PUSCH(s) in the ascending order of the power allocation priorities in accordance with the first form of the scheme F may include the following steps (according to the practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission for the PUSCH without UCI is reduced to 0 and the total transmission power of the UE still exceeds the allowable maximum transmission power of the UE, further reducing the transmission power for the PUSCH with CSI for the carrier group not including the PCC, and maintaining the transmission powers for the remaining channels. In the presence of the PUSCH(s) with the CSI for the carrier group not including the PCC, the powers for these PUSCH(s) may be reduced with equal proportion.

(iii) In the case that the transmission power for the PUSCH with CSI for the carrier group not including the PCC is reduced to 0 and the total transmission power of the UE still exceeds the allowable maximum transmission power of the UE, further reducing the transmission power for the PUCCH with CSI for the carrier group not including the PCC, and maintaining the transmission powers for the remaining channels. In the presence of the PUCCH(s) with the CSI for the carrier group not including the PCC, the powers for these PUCCH(s) may be reduced with equal proportion.

(iv) In the case that the transmission power for the PUCCH with CSI for the carrier group not including the PCC is reduced to 0 and the total transmission power of the UE still exceeds the allowable maximum transmission power of the UE, further reducing the transmission power for the PUSCH with CSI for the carrier group including the PCC, and maintaining the transmission powers for the remaining channels. In the presence of the PUSCH(s) with the CSI for the carrier group including the PCC, the powers for these PUSCH(s) may be reduced with equal proportion.

(v) In the case that the transmission for the PUSCH with CSI for the carrier group including the PCC is reduced to 0 and the total transmission power of the UE still exceeds the allowable maximum transmission power of the UE, further reducing the transmission power for the PUCCH with CSI for the carrier group including the PCC, and maintaining the transmission powers for the remaining channels. In the presence of the PUCCH(s) with the CSI for the carrier group including the PCC, the powers for these PUCCH(s) may be reduced with equal proportion.

(vi) In the case that the transmission power for the PUCCH with CSI for the carrier group including the PCC is reduced to 0 and the total transmission power of the UE still exceeds the allowable maximum transmission power of the UE, further reducing the transmission power for the PUSCH with ACK/NACK for the carrier group not including the PCC, and maintaining the transmission powers for the remaining channels. In the presence of the PUSCH(s) with the ACK/NACK for the carrier group not including the PCC, the powers for these PUSCH(s) may be reduced with equal proportion.

(vii) In the case that the transmission power for the PUSCH with ACK/NACK for the carrier group not including the PCC is reduced to 0 and the total transmission power of the UE still exceeds the allowable maximum transmission power of the UE, further reducing the transmission power for the PUCCH with ACK/NACK for the carrier group not including the PCC, and maintaining the transmission powers for the remaining channels. In the presence of the PUCCH(s) with the ACK/NACK for the carrier group not including the PCC, the powers for these PUCCH(s) may be reduced with equal proportion.

(viii) In the case that the transmission power for the PUCCH with ACK/NACK for the carrier group not including the PCC is reduced to 0 and the total transmission power of the UE still exceeds the allowable maximum transmission power of the UE, further reducing the transmission power for the PUSCH with ACK/NACK for the carrier group including the PCC, and maintaining the transmission powers for the remaining channels. In the presence of the PUSCH(s) with the ACK/NACK for the carrier group including the PCC, the powers for these PUSCH(s) may be reduced with equal proportion.

(ix) In the case that the transmission power for the PUSCH with ACK/NACK for the carrier group including the PCC is reduced to 0 and the total transmission power of the UE still exceeds the allowable maximum transmission power of the UE, further reducing the transmission power for the PUCCH with ACK/NACK for the carrier group including the PCC, and maintaining the transmission powers for the remaining channels. In the presence of the PUCCH(s) with the ACK/NACK for the carrier group including the PCC, the powers for these PUCCH(s) may be reduced with equal proportion.

(x) In the case that the transmission power for the PUCCH with ACK/NACK for the carrier group including the PCC is reduced to 0 and the total transmission power of the UE still exceeds the allowable maximum transmission power of the UE, further reducing the transmission power for the PUCCH with SR of the carrier group not including the PCC, and maintaining the transmission powers for the remaining channels. In the presence of the PUCCH(s) with the SR of the carrier group not including the PCC, the powers for these PUCCH(s) may be reduced with equal proportion.

(xi) In the case that the transmission power for the PUCCH with SR of the carrier group not including the PCC is reduced to 0 and the total transmission power of the UE still exceeds the allowable maximum transmission power of the UE, further reducing the transmission power for the PUCCH with SR of the carrier group including the PCC, and maintaining the transmission powers for the remaining channels. In the presence of the PUCCH(s) with the SR of the carrier group including the PCC, the powers for these PUCCH(s) may be reduced with equal proportion.

In a second form, the scheme F may include that: a power allocation priority of the PUCCH with SR including the PCC>a power allocation priority of the PUCCH with SR not including the PCC≥a power allocation priority of the PUCCH with ACK/NACK including the PCC>a power allocation priority of the PUSCH with ACK/NACK including the PCC>a power allocation priority of the PUCCH with ACK/NACK not including the PCC>a power allocation priority of the PUSCH with ACK/NACK not including the PCC>a power allocation priority of the PUCCH with CSI including the PCC>a power allocation priority of the PUSCH with CSI including the PCC>a power allocation priority of the PUCCH with CSI not including the PCC>a power allocation priority of the PUSCH with CSI not including the PCC>a power allocation priority of the PUSCH without UCI.

Alternatively, in the second form of the scheme F, in the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUCCH(s) with the CSI not including the PCC, these PUCCH(s) have an identical power allocation priority; in the presence of the PUSCH(s) with the ACK/NACK not including the PCC, these PUSCH(s) have an identical power allocation priority; and in the presence of the PUSCH(s) with the CSI not including the PCC, these PUSCH(s) have an identical power allocation priority.

The step of reducing the powers for the PUCCH(s) and/or PUSCH(s) in the ascending order of the power allocation priorities in accordance with the second form of the scheme F may include the following steps (according to the practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power for the PUSCH with CSI not including the PCC, and maintaining the transmission powers for the remaining channels. In the presence of the PUSCH(s) with the CSI not including the PCC, the powers for these PUSCH(s) may be reduced with equal proportion.

(iii) In the case that the transmission power for the PUSCH with CSI not including the PCC is reduced to 0 and the total transmission power of the UE still exceeds the allowable maximum transmission power of the UE, further reducing the transmission power for the PUCCH with CSI not including the PCC, and maintaining the transmission powers for the remaining channels. In the presence of the PUCCH(s) with the CSI not including the PCC, the powers for these PUCCH(s) may be reduced with equal proportion.

(iv) In the case that the transmission power for the PUCCH with CSI not including the PCC is reduced to 0 and the total transmission power of the UE still exceeds the allowable maximum transmission power of the UE, further reducing the transmission power for the PUSCH with CSI including the PCC, and maintaining the transmission powers for the remaining channels. In the presence of the PUSCH(s) with the CSI including the PCC, the powers for these PUSCH(s) may be reduced with equal proportion.

(v) In the case that the transmission power for the PUSCH with CSI including the PCC is reduced to 0 and the total transmission power of the UE still exceeds the allowable maximum transmission power of the UE, further reducing the transmission power for the PUCCH with CSI including the PCC, and maintaining the transmission powers for the remaining channels. In the presence of the PUCCH(s) with the CSI including the PCC, the powers for these PUCCH(s) may be reduced with equal proportion.

(vi) In the case that the transmission power for the PUCCH with CSI including the PCC is reduced to 0 and the total transmission power of the UE still exceeds the allowable maximum transmission power of the UE, further reducing the transmission power for the PUSCH with ACK/NACK not including the PCC, and maintaining the transmission powers for the remaining channels. In the presence of the PUSCH(s) with the ACK/NACK not including the PCC, the powers for these PUSCH(s) may be reduced with equal proportion.

(vii) In the case that the transmission power for the PUSCH with ACK/NACK not including the PCC is reduced to 0 and the total transmission power of the UE still exceeds the allowable maximum transmission power of the UE, further reducing the transmission power for the PUCCH with ACK/NACK not including the PCC, and maintaining the transmission powers for the remaining channels. In the presence of the PUCCH(s) with the ACK/NACK not including the PCC, the powers for these PUCCH(s) may be reduced with equal proportion.

(viii) In the case that the transmission power for the PUCCH with ACK/NACK not including the PCC is reduced to 0 and the total transmission power of the UE still exceeds the allowable maximum transmission power of the UE, further reducing the transmission power for the PUSCH with ACK/NACK including the PCC, and maintaining the transmission powers for the remaining channels. In the presence of the PUSCH(s) with the ACK/NACK including the PCC, the powers for these PUSCH(s) may be reduced with equal proportion.

(ix) In the case that the transmission power for the PUSCH with ACK/NACK including the PCC is reduced to 0 and the total transmission power of the UE still exceeds the allowable maximum transmission power of the UE, further reducing the transmission power for the PUCCH with ACK/NACK including the PCC, and maintaining the transmission powers for the remaining channels. In the presence of the PUCCH(s) with the ACK/NACK including the PCC, the powers for these PUCCH(s) may be reduced with equal proportion.

(x) In the case that the transmission power for the PUCCH with ACK/NACK including the PCC is reduced to 0 and the total transmission power of the UE still exceeds the allowable maximum transmission power of the UE, further reducing the transmission power for the PUCCH with SR not including the PCC, and maintaining the transmission powers for the remaining channels. In the presence of the PUCCH(s) with the SR not including the PCC, the power for these PUCCH(s) may be reduced with equal proportion.

(xi) In the case that the transmission power for the PUCCH with SR not including the PCC is reduced to 0 and the total transmission power of the UE still exceeds the allowable maximum transmission power of the UE, further reducing the transmission power for the PUCCH with SR including the PCC, and maintaining the transmission powers for the remaining channels. In the presence of the PUCCH(s) with the SR including the PCC, the powers for these PUCCH(s) may be reduced with equal proportion.

Alternatively, the scheme G may be determined by ranking the priorities of the types of the UCI, then ranking the priorities of the channels and then ranking the priorities of the carriers. The scheme F determined in this way may include the following two definitions of priorities.

A first definition of priorities of the scheme G may include that: a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, and (alternatively, for the PUCCH(s) with at least the UCI of an identical type and PUSCH(s) with at least the UCI of an identical type) a power allocation priority of the PUCCH with UCI>a power allocation priority of the PUSCH with UCI, (alternatively, for the PUCCH(s) with at least the UCI of an identical type) a power allocation priority of the PUCCH with UCI of the carrier group including the PCC>a power allocation priority of the PUCCH with UCI of the carrier group not including the PCC, and (alternatively, for the PUSCH(s) with at least the UCI of an identical type) a power allocation priority of the PUSCH with UCI of the carrier group including the PCC>a power allocation priority of the PUSCH with UCI of the carrier group not including the PCC.

Alternatively, it may be further specified in the scheme G that, in the presence of the PUCCH(s) with at least the UCI of an identical type of the carrier group not including the PCC, these PUCCH(s) have an identical power allocation priority; and in the presence of the PUSCH(s) with at least the UCI of an identical type of the carrier group not including the PCC, these PUSCH(s) have an identical power allocation priority.

A second definition of priorities of the scheme G may include that: a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI, (alternatively, for the PUCCH(s) with at least the UCI of an identical type and PUSCH(s) with at least the UCI of an identical type) a power allocation priority of the PUCCH with UCI>a power allocation priority of the PUSCH with UCI, (alternatively, for the PUCCH(s) with at least the UCI of an identical type) a power allocation priority of the PUCCH with UCI including the UCI of the PCC>a power allocation priority of the PUCCH with UCI not including the UCI of the PCC, and (alternatively, for the PUSCH(s) with at least the UCI of an identical type) a power allocation priority of the PUSCH with UCI including the UCI of the PCC>a power allocation priority of the PUSCH with UCI not including the UCI of the PCC.

Alternatively, it may be further specified in the scheme G that, in the presence of the PUCCH(s) with at least the UCI of an identical type not including the PCC, these PUCCH(s) have an identical power allocation priority; and in the presence of the PUSCH(s) with at least the UCI of an identical type not including the PCC, these PUSCH(s) have an identical power allocation priority.

For example, based on the above definitions of priorities, a first form of the scheme G includes that: a power allocation priority of the PUCCH with SR of the carrier group including the PCC>a power allocation priority of the PUCCH with SR of the carrier group not including the PCC≥a power allocation priority of the PUCCH with ACK/NACK for the carrier group including the PCC>a power allocation priority of the PUCCH with ACK/NACK for the carrier group not including the PCC>a power allocation priority of the PUSCH with ACK/NACK for the carrier group including the PCC>a power allocation priority of the PUSCH with ACK/NACK for the carrier group not including the PCC>a power allocation priority of the PUCCH with CSI for the carrier group including the PCC>a power allocation priority of the PUCCH with CSI for the carrier group not including the PCC>a power allocation priority of the PUSCH with CSI for the carrier group including the PCC>a power allocation priority of the PUSCH with CSI for the carrier group not including the PCC>a power allocation priority of the PUSCH without UCI. In the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUCCH(s) with the CSI for the carrier group not including the PCC, these PUCCH(s) have an identical power allocation priority; in the presence of the PUSCH(s) with the ACK/NACK for the carrier group not including the PCC, these PUSCH(s) have an identical power allocation priority; and in the presence of the PUSCH(s) with the CSI for the carrier group not including the PCC, these PUSCH(s) have an identical power allocation priority.

The step of reducing the powers for the PUCCH(s) and/or PUSCH(s) in the ascending order of the power allocation priorities in accordance with the first form of the scheme G may include the following steps (according to practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power of the PUSCH with CSI for the carrier group not including the PCC, and maintaining the transmission powers for the remaining channels. In the presence of the PUSCH(s) with the CSI for the carrier group not including the PCC, the powers for these PUSCH(s) may be reduced with equal proportion.

(iii) In the case that the transmission power for the PUSCH with CSI for the carrier group not including the PCC is reduced to 0 and the total transmission power of the UE still exceeds the allowable maximum transmission power of the UE, further reducing the transmission power of the PUSCH with CSI for the carrier group including the PCC, and maintaining the transmission powers for the remaining channels. In the presence of the PUSCH(s) with the CSI for the carrier group including the PCC, the powers for these PUSCH(s) may be reduced with equal proportion.

(iv) In the case that the transmission power for the PUSCH with CSI for the carrier group including the PCC is reduced to 0 and the total transmission power of the UE still exceeds the allowable maximum transmission power of the UE, further reducing the transmission power of the PUCCH with CSI for the carrier group not including the PCC, and maintaining the transmission powers for the remaining channels. In the presence of the PUCCH(s) with the CSI for the carrier group not including the PCC, the powers for these PUCCH(s) may be reduced with equal proportion.

(v) In the case that the transmission power for the PUCCH with CSI for the carrier group not including the PCC is reduced to 0 and the total transmission power of the UE still exceeds the allowable maximum transmission power of the UE, further reducing the transmission power of the PUCCH with CSI for the carrier group including the PCC, and maintaining the transmission powers for the remaining channels. In the presence of the PUCCH(s) with the CSI for the carrier group including the PCC, the powers for these PUCCH(s) may be reduced with equal proportion.

(vi) In the case that the transmission power for the PUCCH with CSI for the carrier group including the PCC is reduced to 0 and the total transmission power of the UE still exceeds the allowable maximum transmission power of the UE, further reducing the transmission power of the PUSCH with ACK/NACK for the carrier group not including the PCC, and maintaining the transmission powers for the remaining channels. In the presence of the PUSCH(s) with the ACK/NACK for the carrier group not including the PCC, the powers for these PUSCH(s) may be reduced with equal proportion.

(vii) In the case that the transmission power for the PUSCH with ACK/NACK for the carrier group not including the PCC is reduced to 0 and the total transmission power of the UE still exceeds the allowable maximum transmission power of the UE, further reducing the transmission power of the PUSCH with ACK/NACK for the carrier group including the PCC, and maintaining the transmission powers for the remaining channels. In the presence of the PUSCH(s) with the ACK/NACK for the carrier group including the PCC, the powers for these PUSCH(s) may be reduced with equal proportion.

(viii) In the case that the transmission power for the PUSCH with ACK/NACK for the carrier group including the PCC is reduced to 0 and the total transmission power of the UE still exceeds the allowable maximum transmission power of the UE, further reducing the transmission power of the PUCCH with ACK/NACK for the carrier group not including the PCC, and maintaining the transmission powers for the remaining channels. In the presence of the PUCCH(s) with the ACK/NACK for the carrier group not including the PCC, the powers for these PUCCH(s) may be reduced with equal proportion.

(ix) In the case that the transmission power for the PUCCH with ACK/NACK for the carrier group not including the PCC is reduced to 0 and the total transmission power of the UE still exceeds the allowable maximum transmission power of the UE, further reducing the transmission power of the PUCCH with ACK/NACK for the carrier group including the PCC, and maintaining the transmission powers for the remaining channels. In the presence of the PUCCH(s)

with the ACK/NACK for the carrier group including the PCC, the powers for these PUCCH(s) may be reduced with equal proportion.

(x) In the case that the transmission power for the PUCCH with ACK/NACK for the carrier group including the PCC is reduced to 0 and the total transmission power of the UE still exceeds the allowable maximum transmission power of the UE, further reducing the transmission power of the PUCCH with SR of the carrier group not including the PCC, and maintaining the transmission powers for the remaining channels. In the presence of the PUCCH(s) with the SR of the carrier group not including the PCC, the powers for these PUCCH(s) may be reduced with equal proportion.

(xi) In the case that the transmission power for the PUCCH with SR of the carrier group not including the PCC is reduced to 0 and the total transmission power of the UE still exceeds the allowable maximum transmission power of the UE, further reducing the transmission power of the PUCCH with SR of the carrier group including the PCC, and maintaining the transmission powers for the remaining channels. In the presence of the PUCCH(s) with the SR of the carrier group including the PCC, the powers for these PUCCH(s) may be reduced with equal proportion.

Based on the above definitions of priorities, a second form of the scheme G may include that: a power allocation priority of the PUCCH with SR including the PCC>a power allocation priority of the PUCCH with SR not including the PCC≥a power allocation priority of the PUCCH with ACK/NACK including the PCC>a power allocation priority of the PUCCH with ACK/NACK not including the PCC>a power allocation priority of the PUSCH with ACK/NACK including the PCC>a power allocation priority of the PUSCH with ACK/NACK not including the PCC>a power allocation priority of the PUCCH with CSI including the PCC>a power allocation priority of the PUCCH with CSI not including the PCC>a power allocation priority of the PUSCH with CSI including the PCC>a power allocation priority of the PUSCH with CSI not including the PCC>a power allocation priority of the PUSCH without UCI.

In the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUCCH(s) with the CSI not including the PCC, these PUCCH(s) have an identical power allocation priority; in the presence of the PUSCH(s) with the ACK/NACK not including the PCC, these PUSCH(s) have an identical power allocation priority; and in the presence of the PUSCH(s) with the CSI not including the PCC, these PUSCH(s) have an identical power allocation priority.

The step of reducing the powers for the PUCCH(s) and/or PUSCH(s) in the ascending order of the power allocation priorities in accordance with the second form of the scheme G may include the following steps (according to the practical need, some of the following steps may be omitted).

(i) Reducing the transmission power for the PUSCH without UCI, and maintaining the transmission powers for the remaining channels. In the presence of the PUSCH(s) that do not carry the UCI, the powers for these PUSCH(s) may be reduced with equal proportion.

(ii) In the case that the transmission power for the PUSCH without UCI is reduced to 0 and the total transmission power of the UE still exceeds the allowable maximum transmission power of the UE, further reducing the transmission power for the PUSCH with CSI not including the PCC, and maintaining the transmission powers for the remaining channels. In the presence of the PUSCH(s) with the CSI not including the PCC, the powers for these PUSCH(s) may be reduced with equal proportion.

(iii) In the case that the transmission power for the PUSCH with CSI not including the PCC is reduced to 0 and the total transmission power of the UE still exceeds the allowable maximum transmission power of the UE, further reducing the transmission power for the PUSCH with CSI including the PCC, and maintaining the transmission powers for the remaining channels. In the presence of the PUSCH(s) with the CSI including the PCC, the powers for these PUSCH(s) may be reduced with equal proportion.

(iv) In the case that the transmission power for the PUSCH with CSI including the PCC is reduced to 0 and the total transmission power of the UE still exceeds the allowable maximum transmission power of the UE, further reducing the transmission power for the PUCCH with CSI not including the PCC, and maintaining the transmission powers for the remaining channels. In the presence of the PUCCH(s) with the CSI not including the PCC, the powers for these PUCCH(s) may be reduced with equal proportion.

(v) In the case that the transmission power for the PUCCH with CSI not including the PCC is reduced to 0 and the total transmission power of the UE still exceeds the allowable maximum transmission power of the UE, further reducing the transmission power for the PUCCH with CSI including the PCC, and maintaining the transmission powers for the remaining channels. In the presence of the PUCCH(s) with the CSI including the PCC, the powers for these PUCCH(s) may be reduced with equal proportion.

(vi) In the case that the transmission power for the PUCCH with CSI including the PCC is reduced to 0 and the total transmission power of the UE still exceeds the allowable maximum transmission power of the UE, further reducing the transmission power for the PUSCH with ACK/NACK not including the PCC, and maintaining the transmission powers for the remaining channels. In the presence of the PUSCH(s) with the ACK/NACK not including the PCC, the powers for these PUSCH(s) may be reduced with equal proportion.

(vii) In the case that the transmission power for the PUSCH with ACK/NACK not including the PCC is reduced to 0 and the total transmission power of the UE still exceeds the allowable maximum transmission power of the UE, further reducing the transmission power for the PUSCH with ACK/NACK including the PCC, and maintaining the transmission powers for the remaining channels. In the presence of the PUSCH(s) with the ACK/NACK including the PCC, the powers for these PUSCH(s) may be reduced with equal proportion.

(viii) In the case that the transmission power for the PUSCH with ACK/NACK including the PCC is reduced to 0 and the total transmission power of the UE still exceeds the allowable maximum transmission power of the UE, further reducing the transmission power for the PUCCH with ACK/NACK not including the PCC, and maintaining the transmission powers for the remaining channels. In the presence of the PUCCH(s) with the ACK/NACK not including the PCC, the powers for these PUCCH(s) may be reduced with equal proportion.

(ix) In the case that the transmission power for the PUCCH with ACK/NACK not including the PCC is reduced to 0 and the total transmission power of the UE still exceeds the allowable maximum transmission power of the UE, further reducing the transmission power for the PUCCH with ACK/NACK including the PCC, and maintaining the transmission powers for the remaining channels. In the presence of the PUCCH(s) with the ACK/NACK including the PCC, the powers for these PUCCH(s) may be reduced with equal proportion.

(x) In the case that the transmission power for the PUCCH with ACK/NACK including the PCC is reduced to 0 and the total transmission power of the UE still exceeds the allowable maximum transmission power of the UE, further reducing the transmission power for the PUCCH with SR not including the PCC, and maintaining the transmission powers for the remaining channels. In the presence of the PUCCH(s) with the SR not including the PCC, the powers for these PUCCH(s) may be reduced with equal proportion.

(xi) In the case that the transmission power for the PUCCH with SR not including the PCC is reduced to 0 and the total transmission power of the UE still exceeds the allowable maximum transmission power of the UE, further reducing the transmission power for the PUCCH with SR including the PCC, and maintaining the transmission powers for the remaining channels. In the presence of the PUCCH(s) with the SR including the PCC, the powers for these PUCCH(s) may be reduced with equal proportion.

The scheme H may include that: a power allocation priority of the PUCCH with UCI>a power allocation priority of the PUSCH with UCI, a power allocation priority of the PUCCH with SR≥a power allocation priority of the PUCCH with ACK/NACK>a power allocation priority of the PUCCH with CSI, and a power allocation priority of the PUSCH with ACK/NACK>a power allocation priority of the PUSCH with CSI>a power allocation priority of the PUSCH without UCI. For the PUCCH(s) with at least the UCI of an identical type, the scheme H may include that: a power allocation priority of the PUCCH with UCI of the carrier group including the PCC>a power allocation priority of the PUCCH with UCI of the carrier group not including the PCC, or a power allocation priority of the PUCCH with UCI including the UCI of the PCC>a power allocation priority of the PUCCH with UCI not including the UCI of the PCC. For the PUSCH(s) with at least the UCI of an identical type, the scheme H may include that: a power allocation priority of the PUSCH with UCI of the carrier group including the PCC>a power allocation priority of the PUSCH with UCI of the carrier group not including the PCC, or a power allocation priority of the PUSCH with UCI including the UCI of the PCC>a power allocation priority of the PUSCH with UCI not including the UCI of the PCC.

Alternatively, it may be further specified in the scheme H that, in the presence of the PUCCH(s) with at least the UCI of an identical type of the carrier group not including the PCC, these PUCCH(s) have an identical power allocation priority, and in the presence of the PUSCH(s) with at least the UCI of an identical type of the carrier group not including the PCC, these PUSCH(s) have an identical power allocation priority; or in the presence of the PUCCH(s) with at least the UCI of an identical type not including the PCC, these PUCCH(s) have an identical power allocation priority, and in the presence of the PUSCH(s) with at least the UCI of an identical type not including the PCC, these PUSCH(s) have an identical power allocation priority.

For example, a first form of the scheme H may include that: a power allocation priority of the PUCCH with SR of the carrier group including the PCC>a power allocation priority of the PUCCH with SR of the carrier group not including the PCC>a power allocation priority of the PUCCH with ACK/NACK for the carrier group including the PCC>a power allocation priority of the PUCCH with ACK/NACK for the carrier group not including the PCC>a power allocation priority of the PUCCH with CSI for the carrier group including the PCC>a power allocation priority of the PUCCH with CSI for the carrier group not including the PCC>a power allocation priority of the PUSCH with ACK/NACK for the carrier group including the PCC>a power allocation priority of the PUSCH with ACK/NACK for the carrier group not including the PCC>a power allocation priority of the PUSCH with CSI for the carrier group including the PCC>a power allocation priority of the PUSCH with CSI for the carrier group not including the PCC>a power allocation priority of the PUSCH without UCI. In the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUCCH(s) with the CSI for the carrier group not including the PCC, these PUCCH(s) have an identical power allocation priority; in the presence of the PUSCH(s) with the ACK/NACK for the carrier group not including the PCC, these PUSCH(s) have an identical power allocation priority; and in the presence of the PUSCH(s) with the CSI for the carrier group not including the PCC, these PUSCH(s) have an identical power allocation priority.

For example, a second form of the scheme H may include that: a power allocation priority of the PUCCH with SR including the PCC>a power allocation priority of the PUCCH with SR not including the PCC>a power allocation priority of the PUCCH with ACK/NACK including the PCC>a power allocation priority of the PUCCH with ACK/NACK not including the PCC>a power allocation priority of the PUCCH with CSI including the PCC>a power allocation priority of the PUCCH with CSI not including the PCC>a power allocation priority of the PUSCH with ACK/NACK including the PCC>a power allocation priority of the PUSCH with ACK/NACK not including the PCC>a power allocation priority of the PUSCH with CSI including the PCC>a power allocation priority of the PUSCH with CSI not including the PCC>a power allocation priority of the PUSCH without UCI. In the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUCCH(s) with the CSI not including the PCC, these PUCCH(s) have an identical power allocation priority; in the presence of the PUSCH(s) with the ACK/NACK not including the PCC, these PUSCH(s) have an identical power allocation priority; and in the presence of the PUSCH(s) with the CSI not including the PCC, these PUSCH(s) have an identical power allocation priority.

The step of reducing the powers for the PUCCH(s) and/or PUSCH(s) in the ascending order of the power allocation priorities in accordance with the above forms of the scheme H is similar to that mentioned in the above schemes, merely with differences in the priority order, so it will be not particularly defined herein.

Alternatively, the scheme I may be determined by ranking the priorities of the channels, then ranking the priorities of the carriers, and then ranking the priorities of the types of the UCI. The scheme I determined in this way may include the following two forms.

A first form of the scheme I may include that: a power allocation priority of the PUCCH with UCI>a power allocation priority of the PUSCH with UCI; for the PUCCH with UCI, a power allocation priority of the PUCCH with UCI of the carrier group including the PCC>a power allocation priority of the PUCCH with UCI of the carrier group not including the PCC; for the PUSCH with UCI, a power allocation priority of the PUSCH with UCI of the carrier group including the PCC>a power allocation priority of the PUSCH with UCI of the carrier group not including the PCC; for the PUCCH with UCI of the carrier group including the PCC, a power allocation priority of the PUCCH with SR≥a power allocation priority of the PUCCH with ACK/NACK>a power allocation priority of the PUCCH with CSI; for the PUCCH with UCI of the carrier group not including the PCC, a power allocation priority of the PUCCH with SR≥a power allocation priority of the PUCCH with ACK/NACK>a power allocation priority of the PUCCH with CSI; for the PUSCH with UCI of the carrier group including the PCC, a power allocation priority of the PUSCH with ACK/NACK>a power allocation priority of the PUSCH with CSI>a power allocation priority of the PUSCH without UCI; and for the PUSCH with UCI of the carrier group not including the PCC, a power allocation priority of the PUSCH with ACK/NACK>a power allocation priority of the PUSCH with CSI>a power allocation priority of the PUSCH without UCI.

A second form of the scheme I may include that: a power allocation priority of the PUCCH with UCI>a power allocation priority of the PUSCH with UCI; for the PUCCH with UCI, a power allocation priority of the PUCCH with UCI including the UCI of the PCC>a power allocation priority of the PUCCH with UCI not including the UCI of the PCC; for the PUSCH with UCI, a power allocation priority of the PUSCH with UCI including the UCI of the PCC>a power allocation priority of the PUSCH with UCI not including the UCI of the PCC; for the PUCCH with UCI including the UCI of the PCC, a power allocation priority of the PUCCH with SR≥a power allocation priority of the PUCCH with ACK/NACK>a power allocation priority of the PUCCH with CSI; for the PUCCH with UCI not including the UCI of the PCC, a power allocation priority of the PUCCH with SR≥a power allocation priority of the PUCCH with ACK/NACK>a power allocation priority of the PUCCH with CSI; for the PUSCH with UCI including the UCI of the PCC, a power allocation priority of the PUSCH with ACK/NACK>a power allocation priority of the PUSCH with CSI>a power allocation priority of the PUSCH without UCI; and for the PUSCH with UCI not including the UCI of the PCC, a power allocation priority of the PUSCH with ACK/NACK>a power allocation priority of the PUSCH with CSI>a power allocation priority of the PUSCH without UCI.

For example, the first form of the scheme I may include that: a power allocation priority of the PUCCH with SR of the carrier group including the PCC>a power allocation priority of the PUCCH with ACK/NACK for the carrier group including the PCC>a power allocation priority of the PUCCH with CSI for the carrier group including the PCC>a power allocation priority of the PUCCH with SR of the carrier group not including the PCC>a power allocation priority of the PUCCH with ACK/NACK for the carrier group not including the PCC>a power allocation priority of the PUCCH with CSI for the carrier group not including the PCC>a power allocation priority of the PUSCH with ACK/NACK for the carrier group including the PCC>a power allocation priority of the PUSCH with CSI for the carrier group including the PCC>a power allocation priority of the PUSCH with ACK/NACK for the carrier group not including the PCC>a power allocation priority of the PUSCH with CSI for the carrier group not including the PCC>a power allocation priority of the PUSCH without UCI. In the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUCCH(s) with the CSI for the carrier group not including the PCC, these PUCCH(s) have an identical power allocation priority; in the presence of the PUSCH(s) with the ACK/NACK for the carrier group not including the PCC, these PUSCH(s) have an identical power allocation priority; and in the presence of the PUSCH(s) with the CSI for the carrier group not including the PCC, these PUSCH(s) have an identical power allocation priority.

For example, the second form of the scheme I may include that: a power allocation priority of the PUCCH with SR including the PCC>a power allocation priority of the PUCCH with ACK/NACK including the PCC>a power allocation priority of the PUCCH with CSI including the PCC>a power allocation priority of the PUCCH with SR not including the PCC>a power allocation priority of the PUCCH with ACK/NACK not including the PCC>a power allocation priority of the PUCCH with CSI not including the PCC>a power allocation priority of the PUSCH with ACK/NACK including the PCC>a power allocation priority of the PUSCH with CSI including the PCC>a power allocation priority of the PUSCH with ACK/NACK not including the PCC>a power allocation priority of the PUSCH with CSI not including the PCC>a power allocation priority of the PUSCH without UCI. In the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUCCH(s) with the CSI not including the PCC, these PUCCH(s) have an identical power allocation priority; in the presence of the PUSCH(s) with the ACK/NACK not including the PCC, these PUSCH(s) have an identical power allocation priority; and in the presence of the PUSCH(s) with the CSI not including the PCC, these PUSCH(s) have an identical power allocation priority.

The step of reducing the powers for the PUCCH(s) and/or PUSCH(s) in the ascending order of the power allocation priorities in accordance with the above forms of the scheme I is similar to that mentioned in the above schemes, merely with differences in the priority order, so it will be not particularly defined herein.

Alternatively, the scheme J may be determined by ranking the priorities of the carriers, then ranking the priorities of the channels, and then ranking the priorities of the types of the UCI. The scheme J determined in this way may include that: power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH and PUSCH with UCI not including the UCI of the PCC. For the PUCCH(s) with UCI of the carrier group including the PCC and PUSCH(s) with UCI of the carrier group including the PCC or for the PUCCH(s) with UCI including the UCI of the PCC and PUSCH(s) with UCI including the UCI of the PCC, the scheme J may include that: a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI. For the PUCCH(s) with UCI of the carrier group not including the PCC and PUSCH(s) with UCI of the carrier group not including the PCC or for the PUCCH(s) with UCI not including the UCI of the PCC and PUSCH(s) with UCI not including the UCI of the PCC, the scheme J may include that: a power allocation priority of the PUCCH with SR≥a power allocation priority of the PUCCH with ACK/NACK>a power allocation priority of the PUSCH with ACK/NACK>a power allocation priority of the PUCCH with CSI>a power allocation priority of the PUSCH with CSI>a power allocation priority of the PUSCH without UCI.

For example, a first form of the scheme J may include that: a power allocation priority of the PUCCH with SR of the carrier group including the PCC≥a power allocation priority of the PUCCH with ACK/NACK for the carrier group including the PCC>a power allocation priority of the PUSCH with ACK/NACK for the carrier group including the PCC>a power allocation priority of the PUCCH with CSI for the carrier group including the PCC>a power allocation priority of the PUSCH with CSI for the carrier group including the PCC>a power allocation priority of the PUCCH with SR of the carrier group not including the PCC≥a power allocation priority of the PUCCH with ACK/NACK for the carrier group not including the PCC>a power allocation priority of the PUSCH with ACK/NACK for the carrier group not including the PCC>a power allocation priority of the PUCCH with CSI for the carrier group not including the PCC>a power allocation priority of the PUSCH with CSI for the carrier group not including the PCC>a power allocation priority of the PUSCH without UCI. In the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUCCH(s) with the CSI for the carrier group not including the PCC, these PUCCH(s) have an identical power allocation priority; in the presence of the PUSCH(s) with the ACK/NACK for the carrier group not including the PCC, these PUSCH(s) have an identical power allocation priority; and in the presence of the PUSCH(s) with the CSI for the carrier group not including the PCC, these PUSCH(s) have an identical power allocation priority.

For example, a second form of the scheme J may include that: a power allocation priority of the PUCCH with SR including the PCC≥a power allocation priority of the PUCCH with ACK/NACK including the PCC>a power allocation priority of the PUSCH with ACK/NACK including the PCC>a power allocation priority of the PUCCH with CSI including the PCC>a power allocation priority of the PUSCH with CSI including the PCC>a power allocation priority of the PUCCH with SR not including the PCC≥a power allocation priority of the PUCCH with ACK/NACK not including the PCC>a power allocation priority of the PUSCH with ACK/NACK not including the PCC>a power allocation priority of the PUCCH with CSI not including the PCC>a power allocation priority of the PUSCH with CSI not including the PCC>a power allocation priority of the PUSCH without UCI. In the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUCCH(s) with the CSI not including the PCC, these PUCCH(s) have an identical power allocation priority; in the presence of the PUSCH(s) with the ACK/NACK not including the PCC, these PUSCH(s) have an identical power allocation priority; and in the presence of the PUSCH(s) with the CSI not including the PCC, these PUSCH(s) have an identical power allocation priority.

The step of reducing the powers for the PUCCH(s) and/or PUSCH(s) in the ascending order of the power allocation priorities in accordance with the above forms of the scheme J is similar to that mentioned in the above schemes, merely with differences in the priority order, so it will be not particularly defined herein.

Alternatively, the scheme K may be determined by ranking the priorities of the carriers, then ranking the priorities of the types of the UCI, and then ranking the priorities of the channels. The scheme K determined in this way may include that: power allocation priorities of the PUCCH with UCI of the carrier group including the PCC and PUSCH with UCI of the carrier group including the PCC>power allocation priorities of the PUCCH with UCI of the carrier group not including the PCC and PUSCH with UCI of the carrier group not including the PCC, or power allocation priorities of the PUCCH with UCI including the UCI of the PCC and PUSCH with UCI including the UCI of the PCC>power allocation priorities of the PUCCH with UCI not including the UCI of the PCC and PUSCH with UCI not including the UCI of the PCC; (alternatively, for the PUCCH(s) with UCI of the carrier group including the PCC and PUSCH(s) with UCI of the carrier group including the PCC and for the PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and for the PUCCH(s) with UCI not including the UCI of the PCC and PUSCH(s) with UCI not including the UCI of the PCC) a power allocation priority of the PUCCH with UCI>a power allocation priority of the PUSCH with UCI; (alternatively, for the PUCCH(s) with UCI of the carrier group including the PCC and PUSCH(s) with UCI of the carrier group including the PCC and for the PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and for the PUCCH(s) with UCI not including the UCI of the PCC and PUSCH(s) with UCI not including the UCI of the PCC) a power allocation priority of the PUCCH with SR≥a power allocation priority of the PUCCH with ACK/NACK>a power allocation priority of the PUCCH with CSI; and (alternatively, for the PUCCH(s) with UCI of the carrier group including the PCC and PUSCH(s) with UCI of the carrier group including the PCC and for the PUCCH(s) with UCI of the carrier group not including the PCC and PUSCH(s) with UCI of the carrier group not including the PCC, or for the PUCCH(s) with UCI including the UCI of the PCC and PUSCH(s) with UCI including the UCI of the PCC and for the PUCCH(s) with UCI not including the UCI of the PCC and PUSCH(s) with UCI not including the UCI of the PCC) a power allocation priority of the PUSCH with ACK/NACK>a power allocation priority of the PUSCH with CSI>a power allocation priority of the PUSCH without UCI.

For example, a first form of the scheme K may include that a power allocation priority of the PUCCH with SR of the carrier group including the PCC≥a power allocation priority of the PUCCH with ACK/NACK for the carrier group including the PCC>a power allocation priority of the PUCCH with CSI for the carrier group including the PCC>a power allocation priority of the PUSCH with ACK/NACK for the carrier group including the PCC>a power allocation priority of the PUSCH with CSI for the carrier group including the PCC>a power allocation priority of the PUCCH with SR of the carrier group not including the PCC≥a power allocation priority of the PUCCH with ACK/NACK for the carrier group not including the PCC>a power allocation priority of the PUCCH with CSI for the carrier group not including the PCC>a power allocation priority of the PUSCH with ACK/NACK for the carrier group not including the PCC>a power allocation priority of the PUSCH with CSI for the carrier group not including PCC>a power allocation priority of the PUSCH without UCI. In the presence of the PUCCH(s) with the SR of the carrier group not including the PCC, these PUCCH(s) have an identical power allocation priority; in the presence of the PUCCH(s) with the ACK/NACK for the carrier group not including the PCC, these PUCCH(s) have an identical power allocation priority; in the presence of the PUCCH(s) with the CSI for the carrier group not including the PCC, these PUCCH(s) have an identical power allocation priority; in the presence of the PUSCH(s) with the ACK/NACK for the carrier group not including the PCC, these PUSCH(s) have an identical power allocation priority; and in the presence of the PUSCH(s) with the CSI for the carrier group not including the PCC, these PUSCH(s) have an identical power allocation priority.

For example, a second form of the scheme K may include that a power allocation priority of the PUCCH with SR including the PCC≥a power allocation priority of the PUCCH with ACK/NACK including the PCC>a power allocation priority of the PUCCH with CSI including the PCC>a power allocation priority of the PUSCH with ACK/NACK including the PCC>a power allocation priority of the PUSCH with CSI including the PCC>a power allocation priority of the PUCCH with SR not including the PCC≥a power allocation priority of the PUCCH with ACK/NACK not including the PCC>a power allocation priority of the PUCCH with CSI not including the PCC>a power allocation priority of the PUSCH with ACK/NACK not including the PCC>a power allocation priority of the PUSCH with CSI not including PCC>a power allocation priority of the PUSCH without UCI. In the presence of the PUCCH(s) with the SR not including the PCC, these PUCCH(s) have an identical power allocation priority; in the presence of the PUCCH(s) with the ACK/NACK not including the PCC, these PUCCH(s) have an identical power allocation priority; in the presence of the PUCCH(s) with the CSI not including the PCC, these PUCCH(s) have an identical power allocation priority; in the presence of the PUSCH(s) with the ACK/NACK not including the PCC, these PUSCH(s) have an identical power allocation priority; and in the presence of the PUSCH(s) with the CSI not including the PCC, these PUSCH(s) have an identical power allocation priority.

Alternatively, during the reduction of the powers, in the presence of a PRACH, it may have the highest power allocation priority, and the powers for the uplink channels may be reduced in accordance with a combination of the power allocation priority of the PRACH and one of the above schemes. In the presence of a plurality of PRACHs, they may have an identical power allocation priority.

The step of reducing the powers for the PUCCH(s) and/or PUSCH(s) in the ascending order of the power allocation priorities in accordance with the above forms of the scheme K is similar to that mentioned in the above schemes, merely with differences in the priority order, so it will be not particularly defined herein.

Alternatively, in the case that the uplink channels whose powers need to be reduced include a plurality of uplink channels having an identical power allocation priority, the powers for the plurality of uplink channels may be reduced with equal proportion, and the uplink channels include one or more of PUCCH, PUSCH and PRACH.

Alternatively, in the case that the CSI includes the periodic CSI and the aperiodic CSI, in the presence of the PUSCH with aperiodic CSI, a power allocation priority of the PUSCH with aperiodic CSI is equal to, greater than, or smaller than a power allocation priority of the PUCCH with periodic CSI. Further, in order to ensure the reporting of the aperiodic CSI, the power allocation priority of the PUSCH with aperiodic CSI may be greater than the power allocation priority of the PUCCH with periodic CSI.

Alternatively, in the embodiments of the present disclosure, in the case that the UCI of various types is carried in one uplink channel (e.g., the PUCCH or PUSCH) (for example, in the case that both the SR and the ACK/NACK, or both the ACK/NACK and the CSI, or all of the SR, ACK/NACK and the CSI, are carried in one uplink channel), the power allocation priority of the uplink channel may be determined in accordance with the highest power allocation priority corresponding to the UCI of various types. In other words, in the case that there are more than one types of the UCI, the power allocation priority of the uplink channel may be determined in accordance with the type of the UCI having the highest priority. To be specific, the uplink channel may be considered as an uplink channel with type of the UCI having the highest priority, and then the power allocation priority of this uplink channel may be determined in accordance with the above-mentioned definitions. Alternatively, the power allocation priorities of this uplink channel may be determined respectively in accordance with types of the UCI carried in the uplink channel, and the highest power allocation priority may be taken as the power allocation priority of the uplink channel.

For example, in the case that the UCI includes both the ACK/NACK and the CSI and the ACK/NACK has a priority higher the CSI, the uplink channel may be considered as an uplink channel with ACK/NACK, and the power allocation priority of the uplink channel may be determined in accordance with the above-mentioned definitions.

For another example, in the case that the UCI includes both the ACK/NACK and SR and the SR has a priority higher than the ACK/NACK, the uplink channel may be considered as an uplink channel with SR, and the power allocation priority of the uplink channel may be determined in accordance with the above-mentioned definitions.

For yet another example, in the case that the UCI includes the ACK/NACK, SR and the CSI and a priority of the SR≥a priority of the ACK/NACK>a priority of the CSI, the uplink channel may be considered as an uplink channel with SR, and the power allocation priority of the uplink channel may be determined in accordance with the above-mentioned definitions.

Alternatively, the carrier group including the PCC is a maser carrier group (MCG). Usually, one UE merely includes one MCG, and all the carriers in the MCG are scheduled by a Master evolved NodeB (MeNB) that serves the MCG. The carrier group not including the PCC is a secondary carrier group (SCG). One UE may include one or more SCGs, and all the carriers in the SCG are scheduled by a Secondary evolved NodeB (SeNB) that serves the SCG.

Alternatively, in the embodiments where the priorities of the carriers are used, for the PUSCH without UCI, a power allocation priority of the PUSCH without UCI transmitted in the carrier group including the PCC>a power allocation priority of the PUSCH without UCI transmitted in the carrier group not including the PCC. This priority order may be incorporated into the schemes B, C, F, G, H, I, J and K, so as to acquire the new schemes, which will not be particularly defined herein.

Figure 2:
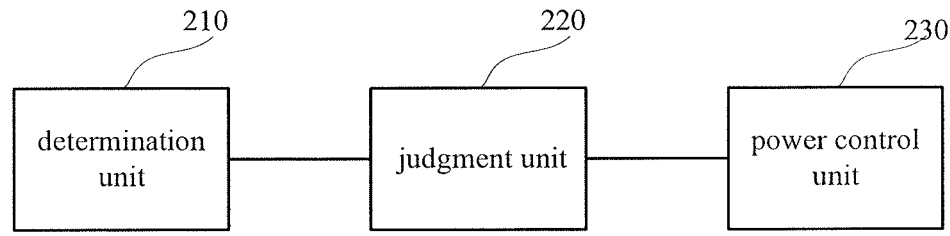
FIG. 2 is a block diagram of a UE according to one embodiment of the present disclosure.

Based on an identical inventive concept, the present disclosure further provides in some embodiments a UE which, as shown in FIG. 2, may include a determination unit 210, a judgment unit 220 and a power control unit 230.

The determination unit 210 is configured to determine target transmission powers for uplink channels in each carrier group. The UE is configured with at least two carrier groups, and UCI in each carrier group is fed back via PUCCH(s) and/or PUSCH(s) on at least one uplink carrier corresponding to the carrier group.

The judgment unit 220 is configured to determine whether or not a sum of the target transmission powers for the simultaneous transmission uplink channels exceeds an allowable maximum transmission power of the UE.

The power control unit 230 is configured to, in the case that the sum of the target transmission powers for the simultaneous transmission uplink channels exceeds the allowable maximum transmission power of the UE, reduce powers for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE.

Alternatively, the power control unit 230 may be further configured to: reduce the powers in accordance with the priorities of the types of the UCI; reduce the powers in accordance with the priorities of the types of the UCI and priorities of carriers; reduce the powers in accordance with the priorities of the types of the UCI and priorities of channels; or reduce the powers in accordance with the priorities of the types of the UCI, the priories of the carriers and the priorities of the channels.

Alternatively, the priorities of the types of the UCI include that a priority of an SR≥a priority of an ACK/NACK>a priority of CSI.

Alternatively, the priorities of the carriers include that a priority of a PCC>a priority of any other component carrier, and/or a priority of carriers in a carrier group that includes a PCC>a priority of carriers in a carrier group that does not include a PCC.

Alternatively, the priorities of the channels include that a priority of the PUCCH>a priority of the PUSCH; and/or the priority of the PUCCH>a priority of the PUSCH with UCI>a priority of the PUSCH without UCI; and/or in the case that the current subframe includes a Physical Random Access Channel (PRACH), a priority of the PRACH≥the priority of the PUCCH>the priority of the PUSCH; and/or in the case that the current subframe includes the PRACH, the priority of the PRACH≥the priority of the PUCCH>the priority of the PUSCH with UCI>the priority of the PUSCH without UCI.

Alternatively, the power control unit 230 may be further configured to: determine power allocation priorities in accordance with the priorities of the types of the UCI, a scheme A for the determined allocation priorities including a power allocation priority of the PUCCH with SR≥power allocation priorities of the PUCCH with ACK/NACK and PUSCH with ACK/NACK>power allocation priorities of the PUCCH with CSI and PUSCH with CSI>a power allocation priority of the PUSCH without UCI; and reduce the powers of the PUCCH(s) and/or PUSCH(s) in an ascending order of the power allocation priorities in accordance with the scheme A.

Alternatively, the scheme A further includes that the PUCCH(s) with at least the UCI of an identical type have an identical power allocation priority, the PUSCH(s) with at least the UCI of an identical type have an identical power allocation priority, and the PUCCH(s) with at least the UCI of an identical type and PUSCH(s) with at least the UCI of an identical type have an identical power allocation priority.

Alternatively, the power control unit 230 may be further configured to: determine power allocation priorities in accordance with the priorities of the types of the UCI and the priorities of the carriers, the determined scheme for the power allocation priorities including a scheme B or a scheme C; and reduce the powers of the PUCCH(s) and/or PUSCH(s) in an ascending order of the power allocation priorities in accordance with the scheme B or scheme C.

The schemes B and C may refer to the contents described hereinbefore, and thus will not be particularly defined herein.

Alternatively, the power control unit 230 may be further configured to: determine power allocation priorities in accordance with the priorities of the types of the UCI and the priorities of the channels, a determined scheme for the power allocation priorities including a scheme D or a scheme E; and reduce the powers of the PUCCH(s) and/or PUSCH(s) in an ascending order of the power allocation priorities in accordance with the scheme D or scheme E.

The schemes D and E may refer to the contents described hereinbefore, and thus will not be particularly defined herein.

Alternatively, the power control unit 230 may be further configured to: determine power allocation priorities in accordance with the priorities of the types of the UCI, the priorities of the carriers and the priorities of the channels, a determined scheme for the power allocation priorities including a scheme F, a scheme G, a scheme H, a scheme I, a scheme J or a scheme K; and reduce the powers of the PUCCH(s) and/or PUSCH(s) in an ascending order of the power allocation priorities in accordance with the scheme F, scheme G, scheme H, scheme I, scheme J or scheme K.

The schemes F, G, H, I, J and K may refer to the contents described hereinbefore, and thus will not be particularly defined herein.

Alternatively, the power control unit 230 may be further configured to, in the case that the uplink channels whose powers need to be reduced include a plurality of uplink channels having an identical power allocation priority, reduce the powers of the plurality of uplink channels with equal proportion. The uplink channels include one or more of PUCCH, PUSCH and PRACH.

Alternatively, the power control unit 230 may be further configured to, in the case that the UCI of various types is carried in one uplink channel, determine the power allocation priority of the uplink channel in accordance with the highest power allocation priority corresponding to the UCI of various types.

Alternatively, the CSI includes periodic CSI and aperiodic CSI, the aperiodic CSI has a power allocation priority higher than the periodic CSI, or in the presence of the PUSCH with aperiodic CSI, a power allocation priority of the PUSCH with aperiodic CSI is equal to, greater than, or smaller than a power allocation priority of the PUCCH with periodic CSI.

Figure 3:
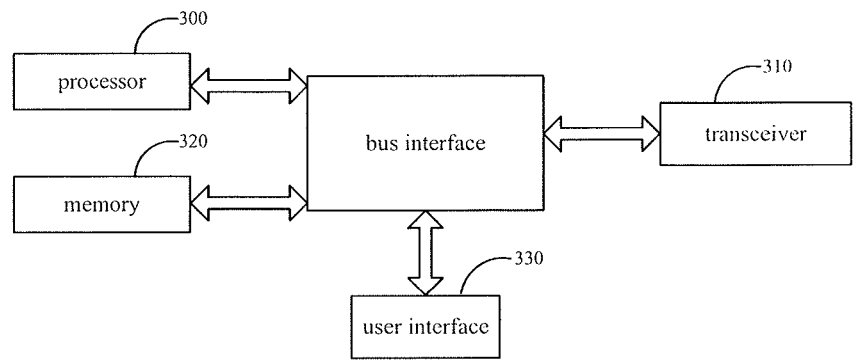
FIG. 3 is another block diagram of the UE according to one embodiment of the present disclosure.

Based on an identical inventive concept, the present disclosure provides in some embodiments a UE which, as shown in FIG. 3, may include a processor 300, a memory 320 and a transceiver 310.

The processor 300 is configured to read a program stored in the memory 320, so as to: determine target transmission powers for uplink channels in each carrier group, the UE being configured with at least two carrier groups, UCI in each carrier group being fed back via PUCCH(s) and/or PUSCH(s) on at least one uplink carrier corresponding to the carrier group; determine whether or not a sum of the target transmission powers for the simultaneous transmission uplink channels exceeds an allowable maximum transmission power of the UE; and in the case that the sum of the target transmission powers for the simultaneous transmission uplink channels exceeds the allowable maximum transmission power of the UE, reduce powers for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE.

The transceiver 310 is configured to receive and transmit data under the control of the processor 300.

In FIG. 3, the bus architecture may include a number of buses and bridges connected to each other, so as to connect various circuits for one or more processors 300 and one or more memories 320. In addition, as is known in the art, the bus architecture may be used to connect any other circuits, such as a circuit for a peripheral device, a circuit for a voltage stabilizer and a power management circuit. Bus interfaces are also provided, and the transceiver 310 may consist of more than one element, e.g., a transmitter and a receiver for communication with any other devices over a transmission medium. With respect to different UEs, a user interface 330 may also be provided for devices which are to be arranged inside or outside the UE, and these devices may include but not limited to a keypad, a display, a speaker, a microphone and a joystick.

The processor 300 takes charge of managing the bus architecture as well as general processing. The memory 320 may store therein data desired for the operation of the processor 300.

According to the power control method and the UE in the embodiments of the present disclosure, it is able to perform the transmission power control on the uplink channels with UCI in a scenario where the PUCCH(s) and/or the PUSCH(s) with UCI are used for the transmission simultaneously, thereby to ensure the transmission of the UCI of a more important type as possible.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processing implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

What is claimed is:

1. A power control method for uplink channels, comprising steps of:

determining, by a User Equipment (UE), target transmission powers for uplink channels in each carrier group, the UE being configured with at least two carrier groups, Uplink Control Information (UCI) in each carrier group being fed back via Physical Uplink Control Channels (PUCCH)(s) and/or Physical Uplink Shared Channels (PUSCH)(s) on at least one uplink carrier corresponding to the carrier group;

determining, by the UE, whether or not a sum of the target transmission powers for the simultaneous transmission uplink channels exceeds an allowable maximum transmission power of the UE; and when the sum of the target transmission powers for the simultaneous transmission uplink channels exceeds the allowable maximum transmission power of the UE, reducing, by the UE, powers for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE;

wherein the step of reducing the powers at least in accordance with the priorities of the types of the UCI comprises:

reducing the powers in accordance with the priorities of the types of the UCI and priorities of carrier groups;

wherein the step of reducing the powers in accordance with the priorities of the types of the UCI and the priorities of the carrier groups comprises:

determining power allocation priorities as: (a power allocation priority of PUCCH(s) with SR of the carrier group including the PCC=a power allocation priority of PUCCH(s) with ACK/NACK of the carrier group including the PCC=a power allocation priority of PUSCH(s) with ACK/NACK of the carrier group including the PCC)>(a power allocation priority of PUCCH(s) with SR of the carrier group not including the PCC=a power allocation priority of PUCCH(s) with ACK/NACK of the carrier group not including the PCC=a power allocation priority of PUSCH(s) with ACK/NACK of the carrier group not including the PCC)>(a power allocation priority of PUCCH(s) with CSI of the carrier group including the PCC=a power allocation priority of PUSCH(s) with CSI of the carrier group including the PCC)>(a power allocation priority of PUCCH(s) with CSI of the carrier group not including the PCC=a power allocation priority of PUSCH(s) with CSI of the carrier group not including the PCC)>a power allocation priority of PUSCH(s) without UCI;

wherein in the case that the UCI of various types is carried in one uplink channel, the power allocation priority of the one uplink channel is determined in accordance with the highest power allocation priority corresponding to the UCI of various types; and reducing the powers of the PUCCH(s) and/or PUSCH(s) in an ascending order of the power allocation priorities.

2. The power control method according to claim 1, wherein in the case that the uplink channels whose powers need to be reduced comprise a plurality of uplink channels having an identical power allocation priority, the powers for the plurality of uplink channels are reduced with equal proportion; and the uplink channels comprise one or more of PUCCH, PUSCH and PRACH.

3. The power control method according to claim 1, wherein the CSI comprises periodic CSI and aperiodic CSI, the aperiodic CSI has a power allocation priority higher than the periodic CSI, or, in the presence of the PUSCH with aperiodic CSI, a power allocation priority of the PUSCH with aperiodic CSI is equal to, greater than, or smaller than a power allocation priority of the PUCCH with periodic CSI.

4. A User Equipment (UE), comprising:

a processor configured to read a program stored in a memory, so as to:

determine target transmission powers for uplink channels in each carrier group, the UE being configured with at least two carrier groups, Uplink Control Information (UCI) in each carrier group being fed back via Physical Uplink Control Channels (PUCCH)(s) and/or Physical Uplink Shared Channels (PUSCH)(s) on at least one uplink carrier corresponding to the carrier group;

determine whether or not a sum of the target transmission powers for the simultaneous transmission uplink channels exceeds an allowable maximum transmission power of the UE; and when the sum of the target transmission powers for the simultaneous transmission uplink channels exceeds the allowable maximum transmission power of the UE, reduce powers for the PUCCH(s) and/or PUSCH(s) carrying the UCI of different carrier groups among the simultaneous transmission uplink channels at least in accordance with priorities of types of the UCI, so that a sum of the transmission powers for all the uplink channels in a current uplink subframe does not exceed the allowable maximum transmission power of the UE;

wherein the processor is further configured to:

reduce the powers in accordance with the priorities of the types of the UCI and priorities of carrier groups;

wherein the processor is further configured to:

determine power allocation priorities as: (a power allocation priority of PUCCH(s) with SR of the carrier group including the PCC=a power allocation priority of PUCCH(s) with ACK/NACK of the carrier group including the PCC=a power allocation priority of PUSCH(s) with ACK/NACK of the carrier group including the PCC)>(a power allocation priority of PUCCH(s) with SR of the carrier group not including the PCC=a power allocation priority of PUCCH(s) with ACK/NACK of the carrier group not including the PCC=a power allocation priority of PUSCH(s) with ACK/NACK of the carrier group not including the PCC)>(a power allocation priority of PUCCH(s) with CSI of the carrier group including the PCC=a power allocation priority of PUSCH(s) with CSI of the carrier group including the PCC)>(a power allocation priority of PUCCH(s) with CSI of the carrier group not including the PCC=a power allocation priority of PUSCH(s) with CSI of the carrier group not including the PCC)>a power allocation priority of PUSCH(s) without UCI;

wherein in the case that the UCI of various types is carried in one uplink channel, the power allocation priority of the one uplink channel is determined in accordance with the highest power allocation priority corresponding to the UCI of various types; and reduce the powers of the PUCCH(s) and/or PUSCH(s) in an ascending order of the power allocation priorities.

* * * * *